(12) United States Patent
Yamazaki

(10) Patent No.: US 11,041,538 B2
(45) Date of Patent: Jun. 22, 2021

(54) VIBRATION PROPAGATION SUPPRESSING APPARATUS

(71) Applicant: MITSUBISHI ELECTRIC CORPORATION, Chiyoda-ku (JP)

(72) Inventor: Tamon Yamazaki, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/636,140

(22) PCT Filed: May 2, 2018

(86) PCT No.: PCT/JP2018/017544
§ 371 (c)(1),
(2) Date: Feb. 3, 2020

(87) PCT Pub. No.: WO2019/064669
PCT Pub. Date: Apr. 4, 2019

(65) Prior Publication Data
US 2020/0217393 A1 Jul. 9, 2020

(30) Foreign Application Priority Data
Sep. 28, 2017 (JP) .............................. JP2017-188306

(51) Int. Cl.
*F16F 15/02* (2006.01)
*F16F 13/10* (2006.01)
*F16M 11/22* (2006.01)

(52) U.S. Cl.
CPC ............ *F16F 15/022* (2013.01); *F16F 13/10* (2013.01); *F16M 11/22* (2013.01); *F16M 2200/08* (2013.01)

(58) Field of Classification Search
USPC ........................................................ 248/562
See application file for complete search history.

(56) References Cited

U.S. PATENT DOCUMENTS

| 5,549,282 A | * | 8/1996 | Ikeda | ..................... B60N 2/522 |
| | | | | 188/266 |
| 5,975,510 A | * | 11/1999 | Miyazaki | ................ F16F 1/371 |
| | | | | 248/550 |

(Continued)

FOREIGN PATENT DOCUMENTS

| JP | 55-112440 A | 8/1980 |
| JP | 64-48635 U | 3/1989 |

(Continued)

OTHER PUBLICATIONS

International Search Report dated Jul. 17, 2018, in PCT/JP2018/017544 filed May 2, 2018.

*Primary Examiner* — Monica E Millner
(74) *Attorney, Agent, or Firm* — Xsensus LLP

(57) ABSTRACT

In a vibration propagation suppressing apparatus, each of fluid machine elements includes: a first volume chamber; a second volume chamber coupled to the first volume chamber through an orifice; an intermediate forming the orifice; and a coupling rod. A first end portion of a first volume chamber is connected to an intermediate adjacent thereto, an intermediate of the first volume chamber is connected to the intermediate of the adjacent fluid machine element through intermediation of an elastic body, and the first volume chamber and the second volume chamber are connected to each other so as to be alternately arranged in a vibration propagation direction. A fluid machine element on a first stage has an intermediate connected to the base surface, and each of the plurality of fluid machine elements has dispersion relationships matching with each other, and has a band gap on the dispersion relationships.

4 Claims, 12 Drawing Sheets

(56) References Cited

U.S. PATENT DOCUMENTS

| | | | | |
|---|---|---|---|---|
| 6,129,185 | A * | 10/2000 | Osterberg | F16F 6/00 188/267.2 |
| 7,182,188 | B2 * | 2/2007 | Ruebsamen | F16F 9/16 188/298 |
| 10,495,281 | B2 * | 12/2019 | Yamazumi | F21S 41/657 |
| 2005/0217954 | A1 * | 10/2005 | Hindle | F16F 13/00 188/298 |
| 2010/0109219 | A1 * | 5/2010 | Melz | F16F 15/007 267/140.15 |
| 2015/0226282 | A1 * | 8/2015 | Hindle | F16F 9/18 188/297 |
| 2019/0211898 | A1 * | 7/2019 | Yamazaki | F16F 9/18 |

FOREIGN PATENT DOCUMENTS

| | | |
|---|---|---|
| JP | 1-169138 A | 7/1989 |
| JP | 5-256334 A | 10/1993 |
| JP | 2009-174604 A | 8/2009 |

* cited by examiner

Related Art

VIBRATION PROPAGATION SUPPRESSING APPARATUS

TECHNICAL FIELD

This invention relates to a vibration propagation suppressing apparatus configured to reduce an input of vibration from an outside to protect a precision instrument.

BACKGROUND ART

In a case of operating or installing a precision instrument having risks such as degradation of performance against external inputs of vibrations and impacts and damage caused by the external inputs, a vibration isolating apparatus is used in some cases for the purpose of protecting the precision instrument from the external inputs. The vibration isolating apparatus is generally an apparatus composed of an elastic material or member, and is inserted into a load transmission path between an external input source and a precision instrument, thereby fulfilling a function to reduce an input of a load to the precision instrument.

First, the most common related-art vibration isolating apparatus is described with reference to FIG. 12. FIG. 12 is a view for illustrating a mechanical model of a related-art single-stage vibration isolating apparatus, and FIG. 13 is an explanatory graph for showing a method of improving vibration transmission characteristics in the related-art single-stage vibration isolating apparatus. In FIG. 13, a vertical axis represents a vibration transmissibility $|T(j\omega)|$, and a horizontal axis represents a normalized frequency $\eta$ in which the logarithm is taken. Here, in order to clearly distinguish the single-stage vibration isolating apparatus from a multi-stage vibration isolating apparatus that follows, the most common related-art vibration isolating apparatus is referred to as a single-stage vibration isolating apparatus for convenience.

A related-art single-stage vibration isolating apparatus 100 includes an elastic element 101 and a damping element 102 coupled in parallel to each other. A precision instrument 120 is supported by the related-art single-stage vibration isolating apparatus 100 with respect to a base surface 121 that receives a forced displacement disturbance. A vibration isolation system is formed of the related-art single-stage vibration isolating apparatus 100, the precision instrument 120, and the base surface 121. When a forced displacement disturbance $X_B$ is applied to the base surface 121, a displacement response of the precision instrument 120 indicates a frequency response that depends on an excitation frequency of the forced displacement disturbance $X_B$ and is called vibration transmission characteristics. The vibration transmission characteristics are performance evaluation indicators of the vibration isolating apparatus. A low-range band in which a response magnification factor is 1 or more and a near-resonance band are called a vibration transmission band, and a high-frequency band on and after a cutoff frequency $\eta_c$, in which a response magnification factor becomes less than 1, is called a vibration isolation band.

It is known that, in the related-art single-stage vibration isolating apparatus 100, an inclination of the vibration isolation band becomes $-20$ dB/dec when the damping element 102 is a viscous damping element. In the related-art single-stage vibration isolating apparatus 100, as a measure for improving a vibration isolation effect, there have been adopted a method of setting rigidity of the elastic element 101 to be low. That is, as illustrated in FIG. 13, through setting the rigidity of the elastic element 101 to be low, the vibration transmission characteristics shift to a low frequency side on a frequency axis. Thus, a response magnification factor at a disturbance frequency $\eta_d$ can be reduced.

However, setting the rigidity of the elastic element 101 to be low brings about a decrease in rigidity to support the precision instrument 120. Such a decrease in rigidity to support the precision instrument 120 brings about spatial destabilization of the precision instrument 120, an increase in settling time of a transient response, and further a decrease in strength of the related-art single-stage vibration isolating apparatus 100 itself. Hence, in actuality, the elastic element 101 has a lower limit value of the rigidity. Thus, in the related-art single-stage vibration isolating apparatus 100, there has been a problem in that the vibration isolation effect cannot be improved beyond a certain level.

As a measure for overcoming such a performance limitation of the related-art single-stage vibration isolating apparatus 100, a multi-stage vibration isolating apparatus is known. FIG. 14 is a view for illustrating a mechanical model of a related-art double-stage vibration isolating apparatus, and each of FIG. 15 and FIG. 16 is a comparison graph for showing vibration transmission characteristics in the related-art single-stage vibration isolating apparatus and the related-art double-stage vibration isolating apparatus. In each of FIG. 15 and FIG. 16, a vertical axis represents a vibration transmissibility $|T(j\omega)|$, and a horizontal axis represents a normalized frequency $\eta$ in which the logarithm is taken. Moreover, FIG. 15 is a graph for showing vibration transmission characteristics when resonance characteristics are allowed to match with each other, and FIG. 16 is a graph for showing vibration transmission characteristics when response magnification factors at a disturbance frequency are allowed to match with each other.

In a related-art double-stage vibration isolating apparatus 110, an intermediate mass 122 is provided between the precision instrument 120 and the base surface 121 that receives the forced displacement disturbance. Such parallel structures each formed of the elastic element 101 and the damping element 102 are incorporated between the precision instrument 120 and the intermediate mass 122 and between the intermediate mass 122 and the base surface 121, respectively. An entire vibration isolation system is formed of the related-art double-stage vibration isolating apparatus 110, the precision instrument 120, and the base surface 121. With the vibration transmission characteristics of the related-art double-stage vibration isolating apparatus 110, a secondary resonance is generated due to the presence of an intermediate mass $m_c$ supported by an elastic body, and meanwhile, an inclination thereof at the high frequency is steepened to $-40$ dB/dec. When the rigidities of the apparatus, that is, primary resonance frequencies are allowed to match with each other by the difference in inclinations of the high-frequency slopes, as illustrated in FIG. 15, the related-art double-stage vibration isolating apparatus 110 exerts a vibration isolation effect superior to the related-art single-stage vibration isolating apparatus 100. When the viscous damping elements are adopted as the damping elements 102, the inclination of the high-frequency slope generally becomes $N \times -20$ dB/dec when the number of stages is N, and a steeper slope is obtained as the number of stages is larger. Moreover, in a case of a viscous elastic body as a representative example of a structure damping element, the inclination of the high-frequency slope becomes $N \times -40$ dB/dec. As described above, in both of the cases, a high vibration isolation effect brought by the increase in the number of stages can be expected.

Moreover, the difference in inclination between the high-frequency slopes contributes to an improvement in robustness of the apparatus. That is, when the response magnification factors at the disturbance frequency are allowed to match with each other, as illustrated in FIG. 16, the related-art double-stage vibration isolating apparatus 110 can set the primary resonance frequency on a higher frequency side than the related-art single-stage vibration isolating apparatus 100. This is equivalent to the improvement in rigidity of the vibration isolating apparatus. Thus, the related-art double-stage vibration isolating apparatus 110 becomes superior to the related-art single-stage vibration isolating apparatus 100 in terms of an improvement in spatial stability of the entire vibration isolation system, an increase in strength of the apparatus itself, or downsizing of the apparatus while maintaining the vibration isolation performance. In practical use, it is preferred that the vibration isolating apparatus have high rigidity and high strength. Accordingly, efforts have been made to increase the number of stages of the apparatus in order to steepen such a high-frequency roll-off of the vibration transmission characteristics. In view of such circumstances, a related-art multi-stage vibration isolating apparatus configured such that two stages or more of dampers are connected in series to one another has been proposed (see, for example, Patent Literature 1).

CITATION LIST

Patent Literature

[PTL 1] JP 2009-174604 A

SUMMARY OF INVENTION

Technical Problem

In a damper using the viscous elastic body described in Patent Literature 1, the inclination of the high-frequency slope becomes −40 dB/dec when the damper is single. In the related-art multi-stage vibration isolating apparatus configured by connecting N stages of such dampers in series to one another, such excellent vibration isolation performance that the inclination of the high-frequency slope becomes N×−40 dB/dec can be achieved. However, in such a related-art multi-stage vibration isolating apparatus, a large number of local resonances are generated by intermediate masses at coupling portions. Accordingly, in the related-art multi-stage vibration isolating apparatus, a desired high-frequency slope is obtained only in a band on and after the generation of all of the local resonances is finished. Hence, when a vibration isolation level for disturbance vibration is defined as a request, a primary resonance frequency, that is, the rigidity of the apparatus cannot be eventually improved beyond a certain level, and there has been a problem in that an upper limit is present in the improvement in robustness of the apparatus.

This invention has been made in order to solve such a problem, and has an object to obtain a vibration isolating apparatus capable of achieving excellent vibration isolation performance while improving robustness of the apparatus.

Solution to Problem

According to this invention, there is provided a vibration propagation suppressing apparatus, including: a plurality of fluid machine elements placed between a base surface that receives a forced displacement disturbance and a support target by being coupled in series to one another on a multiple stages in a vibration propagation direction. Each of the plurality of fluid machine elements includes: a first volume chamber filled with a fluid and having a volume compliance; a second volume chamber coupled to the first volume chamber through an orifice, filled with the fluid and having a volume compliance; an intermediate forming the orifice and having an intermediate mass; and a coupling rod configured to couple a first end portion of the first volume chamber, the first end portion being opposite with the orifice, and a second end portion of the second volume chamber, the second end portion being opposite with the orifice, to each other, wherein, in the plurality of fluid machine elements, a first end portion of a first volume chamber of one fluid machine element is connected to an intermediate of a fluid machine element adjacent to a first end portion side of the one fluid machine element, an intermediate of the first volume chamber of the one fluid machine element is connected to the intermediate of the fluid machine element adjacent to the first end portion side of the one fluid machine element through intermediation of an elastic body, and the first volume chamber and the second volume chamber are connected to each other so as to be alternately arranged in a vibration propagation direction, wherein a fluid machine element on a first stage has an intermediate connected to the base surface, wherein a fluid machine element on a final stage has a first end portion of a first volume chamber connected to the support target, and has an intermediate connected to the support target through intermediation of an elastic body, and wherein each of the plurality of fluid machine elements has dispersion relationships matching with each other, and has a band gap on the dispersion relationships.

Advantageous Effects of Invention

According to this invention, each of the fluid machine elements which form the vibration propagation suppressing apparatus behaves as a 2-inertia resonant system in which a fluid system and a machine system are coupled to each other. Moreover, a periodic structure in which the fluid machine elements as described above are formed on multiple stages by being coupled in series to one another is adopted, thereby an elastic wave in a specific band, which is to propagate on the vibration propagation suppressing apparatus, scatters inside the respective fluid machine elements, and arrival of the elastic wave to the support target is suppressed. At this time, a frequency of the elastic wave suppressed from propagating is present between a primary resonance frequency and a secondary resonance frequency in the entirety of the vibration isolation system, and a vibration isolation band appears immediately after the primary resonance frequency. As described above, the disturbance vibration can be suppressed in a low band immediately after the primary resonance frequency, and accordingly, excellent vibration isolation performance is achieved, and the robustness of the apparatus can be improved.

DESCRIPTION OF EMBODIMENTS

First Embodiment

Figure 1:
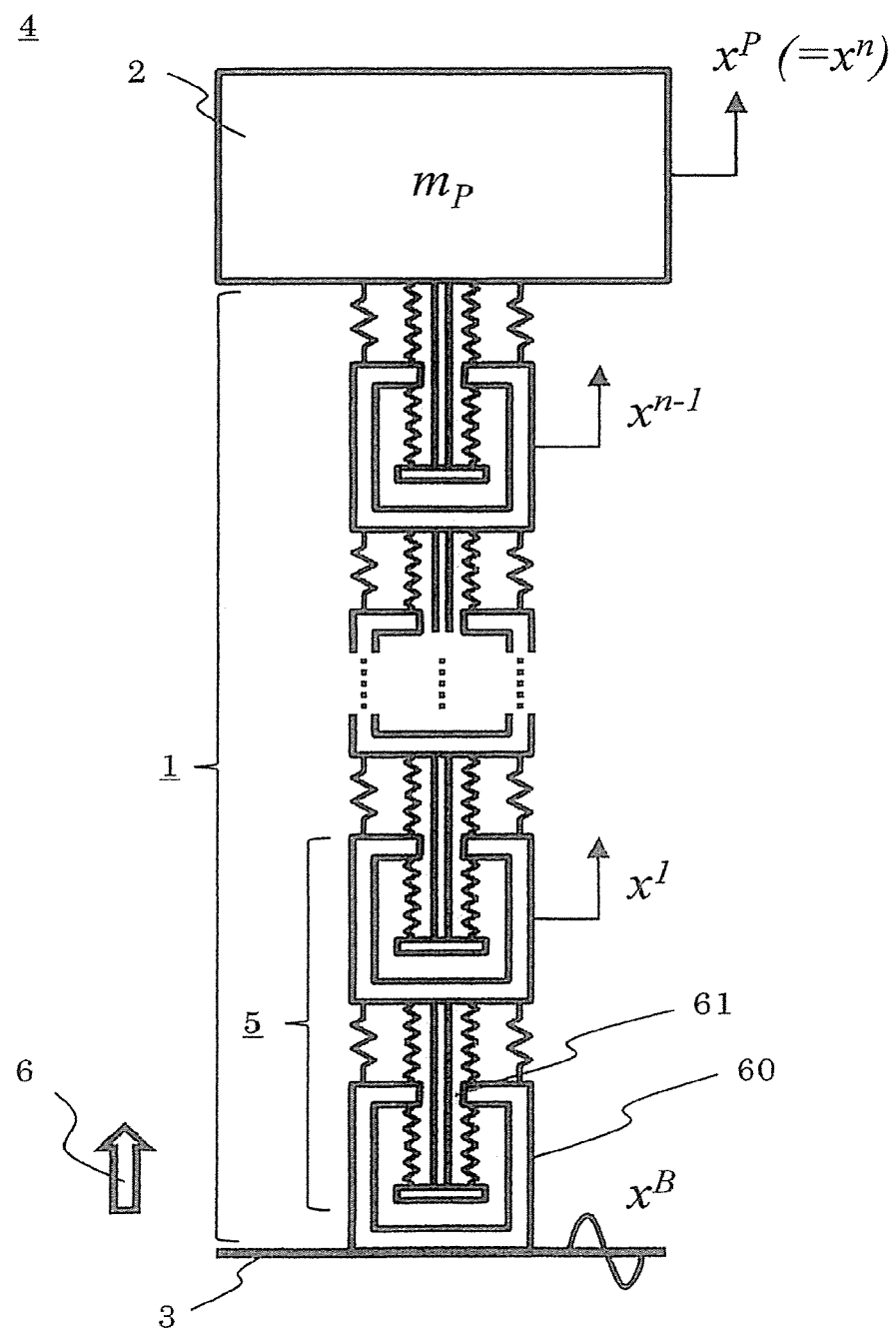
FIG. 1 is a view for illustrating a mechanical model of a vibration propagation suppressing apparatus according to a first embodiment of this invention.
Figure 2:
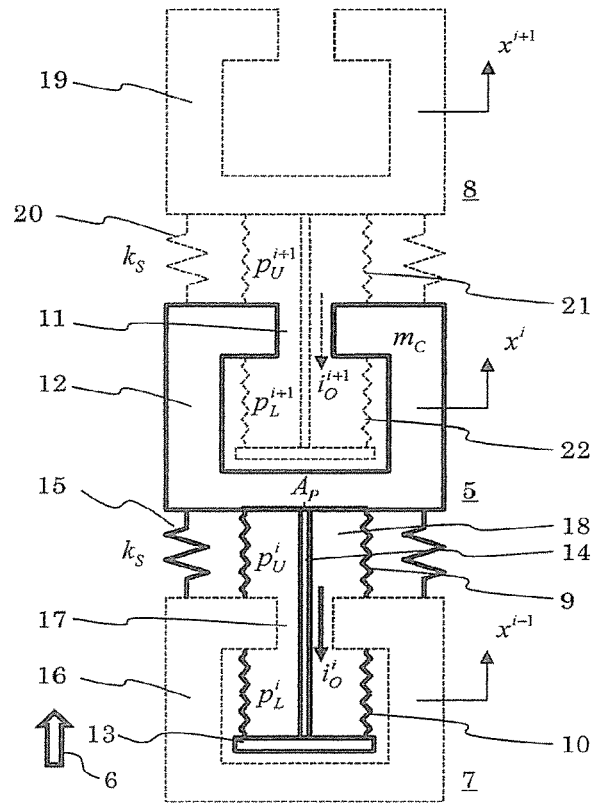
FIG. 2 is a view for illustrating a mechanical model on a periphery of a fluid machine element in the vibration propagation suppressing apparatus according to the first embodiment of this invention.

FIG. 1 is a view for illustrating a mechanical model of a vibration propagation suppressing apparatus according to a first embodiment of this invention. FIG. 2 is a view for illustrating a mechanical model on a periphery of a fluid machine element in the vibration propagation suppressing apparatus according to the first embodiment of this invention.

In FIG. 1, a precision instrument 2 that is a support target is supported by a vibration propagation suppressing apparatus 1 with respect to abase surface 3 that receives a forced displacement disturbance. A vibration isolation system 4 is formed of the vibration propagation suppressing apparatus 1, the precision instrument 2 as a support target, and the base surface 3. The vibration propagation suppressing apparatus 1 is formed by coupling two stages or more of fluid machine elements 5 in series to one another in a vibration propagation direction 6. The fluid machine element 5 on a first stage is connected to the base surface 3. The fluid machine element 5 on a final stage is connected to the precision instrument 2. In order to clarify a difference of the vibration isolating apparatus according to the present invention from the related-art double-stage vibration isolating apparatus 110, the vibration isolating apparatus according to the present invention is referred to as a vibration propagation suppressing apparatus.

As illustrated in FIG. 2, the fluid machine element 5 is formed of an upper volume chamber 9, a lower volume chamber 10, an intermediate 12, a flange 13, a coupling rod 14, and an elastic body 15. The upper volume chamber 9 serves as a first volume chamber that is flexible in the vibration propagation direction 6 and generates a volume change with respect to an internal pressure variation, in other words, has a volume compliance. The lower volume chamber 10 serves as a second volume chamber that is flexible in the vibration propagation direction 6 and has a volume compliance. The intermediate 12 includes an orifice 11, has a fixed mass, and closes an upper end opening of the upper volume chamber 9. The flange 13 closes a lower end opening of the lower volume chamber 10. The coupling rod 14 is rigidity that couples the intermediate 12 and the flange 13 to each other. The elastic body 15 has elasticity in the vibration propagation direction 6. Portions indicated by solid lines in FIG. 2 form a single fluid machine element 5. Here, the fluid machine elements 5, 7 and 8 are formed to be identical to one another. However, for convenience of description, a fluid machine element adjacent to one side of the fluid machine element 5 of interest in the vibration propagation direction 6 is defined as the fluid machine element 7, and a fluid machine element adjacent to another side of the fluid machine element 5 of interest in the vibration propagation direction 6 is defined as the fluid machine element 8. Here, when the internal pressure variation of the volume chamber is $\Delta P$, and a volume change of the volume chamber at that time is $\Delta V$, the volume compliance is defined as $\Delta V/\Delta P$. A unit is $m^3/Pa$.

In the fluid machine element 5 excluding the first stage and the final stage, the upper volume chamber 9 is formed, for example, in such a manner that one end of bellows which are a flexible wall is connected to an intermediate 16 of the fluid machine element 7, and that another end thereof is connected to the intermediate 12. The lower volume chamber 10 is formed, for example, in such a manner that one end of bellows is connected to the flange 13, and that another end thereof is connected to the intermediate 16 of the fluid machine element 7. The coupling rod 14 passes through an orifice 17 of the intermediate 16, and couples the intermediate 12 and the flange 13 to each other. As described above, the upper volume chamber 9 and the lower volume chamber 10 are connected to each other through the orifice 17 of the intermediate 16 of the fluid machine element 7. Thus, a closed space 18 is formed of the orifice 17, the upper volume chamber 9, the lower volume chamber 10, the intermediate 12, the flange 13, and the coupling rod 14. The closed space 18 is filled with a fluid such as water, alcohols, mercury, silicon oil, and air. Moreover, the intermediate 12 and the intermediate 16 of the fluid machine element 7 are connected to each other by the elastic body 15 such as a rubber member and a spring, which has elasticity in the vibration propagation direction 6.

A connection relationship between the fluid machine element 5 and the fluid machine element 8 is identical to a connection relationship between the fluid machine element 5 and the fluid machine element 7, and accordingly, a description thereof is omitted here. Thus, the vibration propagation suppressing apparatus 1 is formed into a periodic structure in which fluid machine elements having the same structure are arranged periodically.

Next, connection between the fluid machine element on the first stage and the base surface 3 is described. A base member 60 is fixed to the base surface 3. In the base member 60, an orifice 61 having a pipe flow resistance value equal to that of the orifice 11 of the intermediate 12 is formed. Here, the intermediate 12 and the base member 60 are orifice forming members.

In the fluid machine element on the first stage, an upper volume chamber is formed, for example, in such a manner that one end of bellows which are a flexible wall is connected to the base member 60, and that another end thereof is connected to an intermediate. A lower volume chamber is formed, for example, in such a manner that one end of bellows is connected to a flange, and that another end thereof is connected to the base member 60. A coupling rod passes through the orifice 61 of the base member 60, and couples the intermediate and the flange to each other. As described above, the upper volume chamber and the lower volume chamber are connected to each other through the orifice 61 of the base member 60. Thus, a closed space is formed of the orifice 61, the upper volume chamber, the lower volume chamber, the intermediate, the flange, and the coupling rod. The closed space is filled with a fluid. Moreover, the intermediate and the base member 60 are connected to each other by an elastic body that has elasticity in the vibration propagation direction.

Subsequently, connection between the fluid machine element on the final stage and the precision instrument 2 is described. In the fluid machine element on the final stage, an upper volume chamber is formed, for example, in such a manner that one end of bellows which are a flexible wall is connected to an intermediate of a fluid machine element closer to the base surface 3, and that another end thereof is connected to the precision instrument 2. A lower volume chamber is formed, for example, in such a manner that one end of bellows is connected to a flange, and that another end thereof is connected to an intermediate of a fluid machine element closer to the base surface 3. A coupling rod passes through an orifice of the intermediate of the fluid machine element closer to the base surface 3, and couples the precision instrument 2 and the flange to each other. As described above, the upper volume chamber and the lower volume chamber are connected to each other through the orifice of the intermediate of the fluid machine element closer to the base surface 3. Thus, a closed space is formed of the orifice, the upper volume chamber, the lower volume chamber, the precision instrument 2, the flange, and the coupling rod. The closed space is filled with a fluid. Moreover, the precision instrument 2 and the intermediate of the fluid machine element closer to the base surface 3 are connected to each other by an elastic body that has elasticity in the vibration propagation direction.

As described above, the fluid machine element on the final stage is formed similarly to other fluid machine elements except for using the precision instrument 2 in place of the intermediate. Moreover, in the fluid machine element on the final stage, an opening of the upper volume chamber, which is closer to the precision instrument 2, is directly closed by the precision instrument 2. However, the opening of the upper volume chamber, which is closer to the precision instrument 2, may be closed by a rigid lid fixed to the precision instrument 2.

Moreover, in each of the fluid machine elements, a fluid portion and a machine portion are designed so that the fluid machine element has a band gap in a dispersion relationship of a traveling wave that propagates through the element.

Next, a basic operation of the fluid machine element 5 is described. When a relative displacement along the vibration propagation direction 6 occurs between the intermediate 12 of the fluid machine element 5 of interest and the intermediate 16 of the fluid machine element 7, a restoring force is applied to each of the intermediates 12 and 16 by the elastic body 15 that connects the intermediates 12 and 16 to each other. Moreover, when a relative displacement along the vibration propagation direction 6 occurs between the intermediate 12 of the fluid machine element 5 of interest and an intermediate 19 of the fluid machine element 8, a restoring force is applied to each of the intermediates 12 and 19 by an elastic body 20 that connects the intermediates 12 and 19 to each other.

At this time, the upper volume chamber 9 and the lower volume chamber 10 exhibit such a respiration motion that an inner space of one of the volume chambers increases, and that an inner space of another volume chamber decreases. Thus, a pressure difference is generated between the upper volume chamber 9 and the lower volume chamber 10. Through use of the pressure difference as a driving source, the fluid inside the upper and lower volume chambers 9 and 10 flows through the orifice 17 based on the pipe flow resistance of the orifice 17 and the volume compliance of the upper and lower volume chambers 9 and 10. At this time, an area of a connection portion of the intermediate 12 to the upper volume chamber 9, which contacts the fluid, becomes a pressure receiving area. Thus, the intermediate 12 of the fluid machine element 5 of interest receives, from the fluid, a force corresponding to a product of an internal pressure of the upper volume chamber 9 and the pressure receiving area. Moreover, an area of a connection portion of the flange 13 to the lower volume chamber 10, which contacts the fluid, becomes a pressure receiving area. Thus, the flange 13 receives, from the fluid, a force corresponding to a product of an internal pressure of the lower volume chamber 10 and the pressure receiving area. Moreover, from an internal fluid of an upper volume chamber 21 as a first volume chamber of the fluid machine element 8, the intermediate 12 receives a force corresponding to a product of an internal pressure of the internal fluid and a pressure receiving area of a connection portion of the intermediate 12 to the upper volume chamber 21. Moreover, from an internal fluid of a lower volume chamber 22 as a second volume chamber of the fluid machine element 8, the intermediate 12 receives a force corresponding to a product of an internal pressure of the internal fluid and a pressure receiving area of a connection portion of the intermediate 12 to the lower volume chamber 22. All of the four pressure receiving areas mentioned above can be approximated as pressure receiving area $A_p$ since a cross-sectional area of each of the orifices 11 and 17 is relatively very small.

Figure 3:
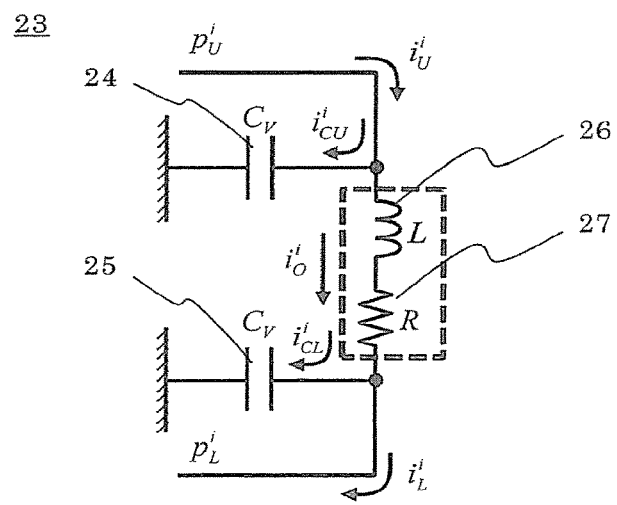
FIG. 3 is an equivalent circuit for simulating a fluid system of the vibration propagation suppressing apparatus according to the first embodiment of this invention.

With the structure described above, when the base surface 3 receives a forced displacement disturbance $x^B$ in FIG. 1, in the vibration isolation system 4 including the precision instrument 2, the intermediate of each fluid machine element and the precision instrument 2 make motions while generating a relative displacement in the vibration propagation direction 6. Moreover, also in each of the upper volume chamber and the lower volume chamber, the vibration isolation system 4 exhibits such complicated behaviors as occurrences of an internal pressure variation following the expansion and the contraction in the vibration propagation direction 6 and movement of the fluid between the volume chambers. Here, as illustrated in FIG. 2 and FIG. 3, an absolute displacement of an intermediate of an i-th fluid machine element in the vibration propagation direction 6 is represented as $x^i$. Moreover, when the fluid machine element on the final stage is further defined to be an n-th fluid machine element, an absolute displacement thereof in the vibration propagation direction 6 is represented as $x^n$, and meanwhile, this absolute displacement is also described as $x^p$ in order to emphasize that the absolute displacement is an absolute displacement of the precision instrument 2.

In the vibration propagation suppressing apparatus 1, by the band gap which the fluid machine element has on the dispersion relationship, a stop band including an antiresonance frequency after a primary resonance frequency is formed in vibration propagation characteristics which are a displacement ratio of the base surface 3 and the precision instrument 2. An inclination from the primary resonance frequency to the antiresonance frequency that is a stop band starting band becomes steeper in comparison with the related-art vibration propagation suppressing apparatus. Thus, the vibration propagation suppressing apparatus 1 can increase the rigidity in comparison with the related-art vibration propagation suppressing apparatus while maintaining a vibration propagation suppression effect. Such an increase in rigidity of the apparatus brings about a reduction of a static deflection of the apparatus under a gravity environment and a reduction of a dynamic deflection of the apparatus under a vibration environment, and enable an improvement in spatial stability of the precision instrument 2 to be supported thereby. Moreover, the reductions of the static/dynamic deflections reduce a stress generated in the apparatus, and accordingly, the strength of the apparatus is increased, thus enabling reduction in size and weight of the apparatus within a range of an obtained margin for the stress.

A description is made of a derivation calculation process of a band gap which the fluid machine element of the present invention exhibits in a dispersion relationship of an elastic traveling wave that propagates on the vibration propagation suppressing apparatus 1 below. Moreover, a description is made of the fact that, when such fluid machine elements each having the band gap are coupled in series to one another, a stop band in which a vibration transmissibility decreases at a generation frequency of the band gap is formed.

First, an equation of motion of a mechanical vibration system of the intermediate 12 in the vibration propagation direction 6 is represented by Equation (1).

[Math. 1]

$$m_c \ddot{x}^i = k_s(x^{i+1}-x^i) - k_s(x^i-x^{i-1}) - A_p(P_U^{i+1}-P_L^{i+1}) + A_P(P_U^i - P_L^i) \quad (1)$$

where $x^i$: displacement of intermediate 12 of i-th fluid machine element 5 from initial position in vibration propagation direction [m]

$p^i_U$: internal pressure of upper volume chamber 9 of i-th fluid machine element 5 [Pa] $p^i_L$: internal pressure of lower volume chamber 10 of i-th fluid machine element 5 [Pa]

$m_c$: mass of intermediate 12 [kg]

$k_s$: Rigidity of elastic bodies 15 and 20 in vibration propagation direction 6 [N/m]

$A_p$: fluid pressure receiving area of connection portion between upper end of upper volume chamber 9 and lower end of intermediate 12 [m²]

(=fluid pressure receiving area of connection portion between lower end of lower volume chamber 10 and flange 13

=fluid pressure receiving area of connection portion between lower end of upper volume chamber 21 and intermediate 12

=fluid pressure receiving area of connection portion between upper end of lower volume chamber 22 and intermediate 12)

As seen from Equation (1), with regard to the intermediate 12 of the fluid machine element 5, an operation thereof is controlled by a restoring force from the elastic body connected thereto, and by a pressure of a fluid in the volume chamber connected thereto.

Subsequently, an equivalent circuit 23 illustrated in FIG. 3 is introduced in an event of deriving an equation of motion of a fluid vibration system. FIG. 3 is an equivalent circuit for simulating a fluid system of the vibration propagation suppressing apparatus according to the first embodiment of this invention.

This equivalent circuit 23 is formed of: a volume compliance 24 of the upper volume chamber 9; a volume compliance 25 of the lower volume chamber 10; an effective fluid inertia 26 of the fluid of the orifice 17; and a pipe flow resistance 27 of the orifice 17. Symbols in FIG. 3 represent the following:

$C_v$: volume compliance of each of upper volume chamber 9 and lower volume chamber 10 [m³/Pa]

L: effective fluid inertia of fluid flowing through orifice 17 [Pa-s²/m³]

R: pipe flow resistance of orifice 17 [Pa-s/m³]

$p^i_U$: internal pressure of upper volume chamber 9 of i-th fluid machine element 5 [Pa]

$p^i_L$: internal pressure of lower volume chamber 10 of i-th fluid machine element 5 [Pa]

$i^i_U$: forced flow rate generated in upper volume chamber 9 of i-th fluid machine element 5 [m³/s]

$i^i_L$: forced flow rate generated in lower volume chamber 10 of i-th fluid machine element 5 [m³/s]

$i^i_{CU}$: flow rate consumed for expansion of upper volume chamber 9 of i-th fluid machine element 5 [m³/s]

$i^i_{CL}$: flow rate consumed for expansion of lower volume chamber 10 of i-th fluid machine element 5 [m³/s]

$i^i_O$: orifice flow rate of i-th fluid machine element 5 [m³/s]

The effective fluid inertia L and the pipe flow resistance R are represented by Equation (2) and Equation (3).

[Math. 2]

$$L = \frac{\rho l}{A_O} \quad (2)$$

[Math. 3]

$$R = \frac{8\pi \rho v l}{A_O^2} \quad (3)$$

where

ρ: density of fluid [kg/m³]

v: dynamic viscosity of fluid [m²/s]

l: length of orifice 17 [m]

$A_o$: cross-sectional area of orifice 17 [m²]

An equation of continuity of the above-described equivalent circuit 23 becomes Equation (4), which assumes a non-compressed fluid.

[Math. 4]

$$\begin{cases} i_U^i = i_{CU}^i + i_O^i \\ i_O^i = i_{CL}^i + i_L^i \end{cases} \quad (4)$$

An equation of a pressure drop of an orifice portion is Equation (5).

[Math. 5]

$$P_u^i - P_L^i = R i_o^i + L \dot{i}_o^i \quad (5)$$

Equation (6) is derived from a condition in which the Equation (5) is equal to a pressure difference between the upper and lower volume chambers.

[Math. 6]

$$\frac{\int i_{CU}^i dt}{C_V} - \frac{\int i_{CL}^i dt}{C_V} = R i_o^i + L \dot{i}_o^i \quad (6)$$

Moreover, a flow rate of a fluid that flows in from an upper end of the equivalent circuit 23 and flows out from a lower end thereof is a forced flow rate by a relative displacement with respect to the intermediate connected thereto along the vibration propagation direction 6. Here, the intermediate changes to the base member or the precision instrument 2 when the fluid machine element on the first stage or the final stage is connected. The forced flow rate is represented by Equation (7). The symbol $A_P$ in this equation means an effective cross-sectional area of the upper volume chamber 9 and the lower volume chamber 10, and the effective cross-sectional area is approximately equal to the above-mentioned pressure receiving area, and accordingly, the same symbol is adopted therefor. $A_P$ is generically referred to as a fluid pressure receiving area below.

[Math. 7]

$$\begin{cases} i_U^i = -A_P(\dot{x}^i - \dot{x}^{i-1}) \\ i_L^i = -A_P(\dot{x}^i - \dot{x}^{i-1}) \end{cases} \quad (7)$$

The Equation (4) to Equation (7) are organized like Equation (8) by using a time integration value $q_O^i$ of the orifice flow rate $i_O^i$ and the displacement $x^{i-1}$, $x^i$ of the connected intermediate.

[Math. 8]

$$L\ddot{q}_O^i + R\dot{q}_O^i + \frac{2}{C_V}q_O^i + \frac{2A_P}{C_V}(x^i - x^{i-1}) = 0 \quad (8)$$

It is seen that a behavior of the equivalent circuit 23 is determined by the equivalent fluid inertia L, the orifice pipe flow resistance R, the volume compliances $C_V$ of the upper and lower volume chambers, the fluid pressure receiving area $A_P$, and the displacement $x^i$, $x^{i-1}$ of the intermediate.

The behaviors of the machine vibration portion and the fluid vibration portion, which are derived in the above-described manner, are coupled to each other via the fluid pressure receiving area $A_P$, and can be collectively described in a matrix format of Equation (9).

[Math. 9]

$$\underbrace{\begin{bmatrix} 0 & 0 \\ 0 & 0 \end{bmatrix}}_{M^{i-1}} \begin{bmatrix} \ddot{x}^{i-1} \\ \ddot{q}_O^{i-1} \end{bmatrix} + \underbrace{\begin{bmatrix} 0 & 0 \\ 0 & 0 \end{bmatrix}}_{C^{i-1}} \begin{bmatrix} \dot{x}^{i-1} \\ \dot{q}_O^{i-1} \end{bmatrix} + \underbrace{\begin{bmatrix} -k_S & 0 \\ -2A_P/C_V & 0 \end{bmatrix}}_{K^{i-1}} \begin{bmatrix} x^{i-1} \\ q_O^{i-1} \end{bmatrix} +$$

$$\underbrace{\begin{bmatrix} m_C & -A_P L \\ 0 & L \end{bmatrix}}_{M^i} \begin{bmatrix} \ddot{x}^i \\ \ddot{q}_O^i \end{bmatrix} + \underbrace{\begin{bmatrix} 0 & -A_P R \\ 0 & R \end{bmatrix}}_{C^i} \begin{bmatrix} \dot{x}^i \\ \dot{q}_O^i \end{bmatrix} +$$

$$\underbrace{\begin{bmatrix} 2k_S & 0 \\ 2A_P/C_V & 2/C_V \end{bmatrix}}_{K^i} \begin{bmatrix} x^i \\ q_O^i \end{bmatrix} + \underbrace{\begin{bmatrix} 0 & A_P L \\ 0 & 0 \end{bmatrix}}_{M^{i+1}} \begin{bmatrix} \ddot{x}^{i+1} \\ \ddot{q}_O^{i+1} \end{bmatrix} +$$

$$\underbrace{\begin{bmatrix} 0 & A_P R \\ 0 & 0 \end{bmatrix}}_{C^{i+1}} \begin{bmatrix} \dot{x}^{i+1} \\ \dot{q}_O^{i+1} \end{bmatrix} + \underbrace{\begin{bmatrix} -k_S & 0 \\ 0 & 0 \end{bmatrix}}_{K^{i+1}} \begin{bmatrix} x^{i+1} \\ q_O^{i+1} \end{bmatrix} = 0 \quad (9)$$

Here, the intermediate displacement and the orifice flow rate integration value are turned into a state vector with Equation (10).

[Math. 10]

$$\xi^i = \begin{bmatrix} x^i \\ q_O^i \end{bmatrix} \quad (10)$$

Moreover, the respective coefficients of the state vector are represented as Equation (11) to Equation (19).

[Math. 11]

$$M^{i-1} = \begin{bmatrix} 0 & 0 \\ 0 & 0 \end{bmatrix} \quad (11)$$

[Math. 12]

$$C^{i-1} = \begin{bmatrix} 0 & 0 \\ 0 & 0 \end{bmatrix} \quad (12)$$

[Math. 13]

$$K^{i-1} = \begin{bmatrix} -k_S & 0 \\ -2A_P/C_V & 0 \end{bmatrix} \quad (13)$$

[Math. 14]

$$M^i = \begin{bmatrix} m_C & -A_P L \\ 0 & L \end{bmatrix} \quad (14)$$

[Math. 15]

$$C^i = \begin{bmatrix} 0 & -A_P R \\ 0 & R \end{bmatrix} \quad (15)$$

[Math. 16]

$$K^i = \begin{bmatrix} 2k_S & 0 \\ 2A_P/C_V & 2/C_V \end{bmatrix} \quad (16)$$

[Math. 17]

$$M^{i+1} = \begin{bmatrix} 0 & A_P L \\ 0 & 0 \end{bmatrix} \quad (17)$$

[Math. 18]

$$C^{i+1} = \begin{bmatrix} 0 & A_P R \\ 0 & 0 \end{bmatrix} \quad (18)$$

[Math. 19]

$$K^{i+1} = \begin{bmatrix} -k_S & 0 \\ 0 & 0 \end{bmatrix} \quad (19)$$

Thus, Equation (9) can be written as Equation (20).

[Math. 20]

$$(M^{i-1}\xi^{i-1} + C^{i-1}\dot{\xi}^{i-1} + K^{i-1}\xi^{i-1})$$
$$+ (M^i\ddot{\xi}^i + C^i\dot{\xi}^i + K^i\xi^i)$$
$$+ (M^{i+1}\ddot{\xi}^{i+1} + C^{i+1}\dot{\xi}^{i+1} + K^{i+1}\xi^{i+1}) = 0 \quad (20)$$

Here, it is assumed that a traveling wave with an amplitude ([Math. 21]), a wave number k, and a frequency ω, which is represented by Equation (21), propagates on the fluid machine element 5.

[Math. 21]

$$\Xi^i$$

Here, j is an imaginary unit.

[Math. 22]

$$\xi^i = \Xi^i e^{j(Kx - \omega t)} \quad (21)$$

Then, the state quantities and time derivatives of the fluid machine element itself and the fluid machine elements adjacent thereto can be represented as Equation (22) to Equation (24), respectively. Here, α is a distance [m] between the fluid machine elements.

[Math. 23]

$$\begin{cases} \xi^{i-1} = e^{-jK\alpha}\xi^i \\ \xi^i = \xi^i \\ \xi^{i+1} = e^{jK\alpha}\xi^i \end{cases} \quad (22)$$

[Math. 24]

$$\begin{cases} \dot{\xi}^{i-1} = (-j\omega)e^{-jK\alpha}\xi^i \\ \dot{\xi}^i = (-j\omega)\xi^i \\ \dot{\xi}^{i+1} = (-j\omega)e^{jK\alpha}\xi^i \end{cases} \quad (23)$$

[Math. 25]

$$\begin{cases} \ddot{\xi}^{i-1} = -\omega^2 e^{-jK\alpha}\xi^i \\ \ddot{\xi}^i = -\omega^2 \xi^i \\ \ddot{\xi}^{i+1} = -\omega^2 e^{jK\alpha}\xi^i \end{cases} \quad (24)$$

When these are assigned to Equation (20), these can be organized as Equation (25).

[Math. 26]

$$\begin{bmatrix} -\omega^2(e^{-jK\alpha}M^{i-1} + M^i + e^{jK\alpha}M^{i+1}) \\ -j\omega(e^{-jK\alpha}C^{i-1} + C^N + e^{jK\alpha}C^{i+1}) \\ +(e^{-jK\alpha}K^{i-1} + K^i + e^{jK\alpha}K^{i+1}) \end{bmatrix} \xi^i = 0 \quad (25)$$

A condition in which the determinant in the parenthesis is 0 must be satisfied in order that Equation (25) is established for $\xi^i \neq 0$, and accordingly, Equation (26) is established.

[Math. 27]

$$\det \begin{bmatrix} -\omega^2(e^{-jK\alpha}M^{i-1} + M^i + e^{jK\alpha}M^{i+1}) \\ -j\omega(e^{-jK\alpha}C^{i-1} + C^i + e^{jK\alpha}C^{i+1}) \\ +(e^{-jK\alpha}K^{i-1} + K^i + e^{jK\alpha}K^{i+1}) \end{bmatrix} = 0 \quad (26)$$

Equation (27) is obtained when the determinant (26) is written down.

[Math. 28]

$$Lm_C\omega^4 + jRm_C\omega^3 - \left\{\frac{2m_C}{C_V} + 2L(1 - \cos\mu)\left(k_S + \frac{2A_P^2}{C}\right)\right\}\omega^2 - \quad (27)$$
$$2jR\{1 - \cos\mu)\left(k_S + \frac{2A_P^2}{C}\right)\omega + \frac{4k_S}{C}(1 - \cos\mu) = 0$$

Particularly when no damping is present, Equation (28) is established.

[Math. 29]

$$Lm_C\omega^4 - \left\{\frac{2m_C}{C_V} + 2L(1 - \cos\mu)\left(k_S + \frac{2A_P^2}{C}\right)\right\}\omega^2 + \quad (28)$$
$$\frac{4k_S}{C}(1 - \cos\mu) = 0$$

Here, assignment as μ=kα is given, and this is referred to as "phase between fluid machine elements based on wave number". When Equation (28) is solved for ω, Equation (29) is established.

[Math. 30]

$$\omega^2(\mu) = \frac{1}{2}\left\{\omega_f^2 + 2(1 - \cos\mu)(\omega_m^2 + \omega_{mf}^2) \pm \quad (29)\right.$$
$$\left.\sqrt{\left\{\frac{\omega_f^2 + 2(1 - \cos\mu)}{(\omega_m^2 + \omega_{mf}^2)}\right\}^2 - 8(1 - \cos\mu)\omega_m^2\omega_f^2}\right\}$$

Here, a natural frequency of the fluid vibration system, a natural frequency of the mechanical vibration system, and a fluid machine coupling term are represented as Equation (30) to Equation (32), respectively.

[Math. 31]
$$\omega_f = \sqrt{\frac{2}{LC}} \quad (30)$$

[Math. 32]
$$\omega_m = \sqrt{\frac{2k_S}{m_C}} \quad (31)$$

[Math. 33]
$$\omega_{mf} = \sqrt{\frac{2A_p^2}{m_C C}} \quad (32)$$

Equation (29) is an equation that represents a relationship between the wave number k and the frequency ω, which is satisfied by an elastic traveling wave capable of propagating on the periodic structure in which the fluid machine elements 5 are connected in series to one another on the multiple stages, and this equation is referred to as "dispersion relationship". In other words, the dispersion relationship determines the wave number of the traveling wave that propagates on the periodic structure when one end of the periodic structure is excited at the frequency ω.

Figure 4:
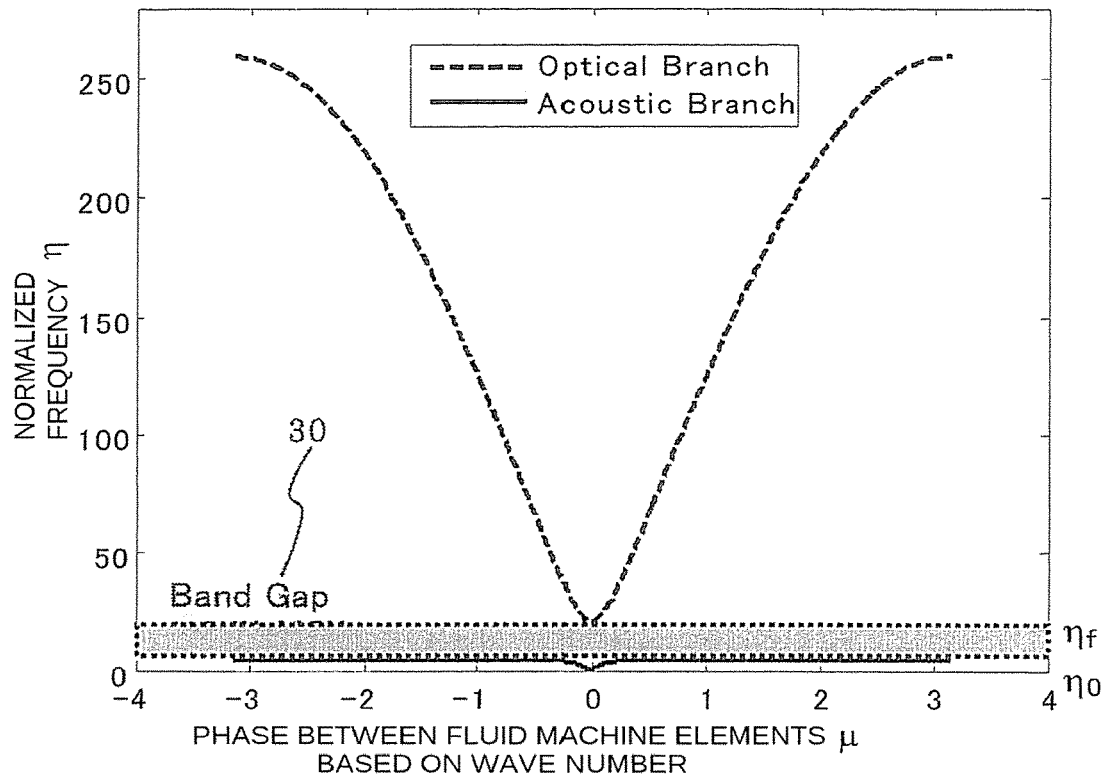
FIG. 4 is a graph for showing a dispersion function which an elastic wave satisfies, the elastic wave propagating on the vibration propagation suppressing apparatus according to the first embodiment of this invention.

An example of a graph illustrating the dispersion relationship is illustrated in FIG. 4. FIG. 4 is a graph for showing a dispersion function which the elastic wave propagating on the vibration propagation suppressing apparatus according to the first embodiment of this invention satisfies. Here, in FIG. 4, a vertical axis represents a normalized frequency η obtained by dividing the excitation frequency by the resonance frequency of the vibration isolation system 4, and a horizontal axis represents a phase p between the fluid machine elements, which is based on the wave number.

From FIG. 4, two types of V-shaped dispersion relationships can be recognized. Pursuant to a custom, a low frequency side is referred to as an acoustic branch 28, a high frequency side is referred to as an optical branch 29, and are written as Equation (33) and Equation (34), respectively.

[Math. 34]
$$\omega_{acs}(\mu) \equiv \omega^-(\mu) \quad (33)$$

[Math. 35]
$$\omega_{opt}(\mu) \equiv \omega^+(\mu) \quad (34)$$

Here, plus signs in Equation (33) and Equation (34) correspond to signs in Equation (29). These dispersion relationships become periodic functions regarding p, which use Equation (35) as a fundamental period.

[Math. 36]
$$-\pi \leq \mu \leq \pi \quad (35)$$

Here, from the graph of the dispersion relationships, which is shown in FIG. 4, it is seen that an excitation frequency band that does not have the wave number k is present. This is a so-called band gap 30, which indicates that the traveling wave with the frequency cannot be present on the periodic structure. From the graph, it is seen that a frequency band of this band gap 30 is a section represented by Equation (36).

[Math. 37]
$$\max(\omega_{acs}) \leq \min(\omega_{opt}) \quad (36)$$

An upper limit value max $(\omega_{acs})$ and lower limit value min $(\omega_{opt})$ of the frequency band of the band gap 30 are obtained by Equation (37) and Equation (38), respectively.

[Math. 38]
$$\max(\omega_{acs}) = \quad (37)$$
$$\omega_{acs}(\mu = \pi) = \sqrt{\frac{1}{2}\left\{\left(\frac{\omega_f^2 + 4\omega_m^2 +}{4\omega_{mf}^2}\right) - \sqrt{\left(\frac{\omega_f^2 + 4\omega_m^2 +}{4\omega_{mf}^2}\right)^2 - 16\omega_m^2\omega_f^2}\right\}}$$

[Math. 39]
$$\min(\omega_{opt}) = \omega_{opt}(\mu = 0) \quad (38)$$
$$= \omega_f$$

The frequency that cannot be present on the periodic structure in which the fluid machine elements 5 are connected to one another on the multiple stages exhibits a unique effect that the frequency is determined by only design of a single piece of the fluid machine element 5, and is not changed even when the number of stages of such fluid machine elements 5 is increased.

Moreover, for example, when such a fluid machine element with high damping characteristics as disclosed in the related-art apparatus is used, the band gap 30 disappears or is narrowed. Therefore, the fluid machine element having the same configuration does not always exhibit the band gap 30. Accordingly, the fluid machine elements 5 need to be selected based on Equation (37) and Equation (38) so as to each exhibit the band gap 30.

Confirmed is that the vibration propagation suppressing apparatus 1 in which the fluid machine elements 5 each having such a band gap 30 are connected in series to one another on the multiple stages forms the stop band for shielding the vibration propagation in the same band. Based on the equation of motion of the fluid machine elements 5, an equation of motion of the entire vibration isolation system 4 including the precision instrument 2 and the base surface 3 that receives the forced displacement disturbance is given as in Equation (39).

[Math. 40]
$$M\ddot{\xi} + C\dot{\xi} + K\xi = K_\beta X^\beta \quad (39)$$

The state vector is defined as Equation (40).

[Math. 41]
$$\xi \equiv \begin{bmatrix} \begin{bmatrix} x^N \\ q_O^N \end{bmatrix} \\ \begin{bmatrix} x^{N-1} \\ q_O^{N-1} \end{bmatrix} \\ \vdots \\ \begin{bmatrix} x^1 \\ q_O^1 \end{bmatrix} \end{bmatrix} \in R^{2N} \quad (40)$$

where $[x^i q_O^i]^T$: intermediate mass displacement and orifice flow rate of i-th fluid machine element $x^B$: forced displacement disturbance of base surface 3

Particularly, the relationship of Equation (41) is present on the N-th stage, and the final stage of the periodic structure corresponds to the displacement of the precision instrument 2 and the orifice flow rate of the intermediate mass immediately thereunder.

[Math. 42]

$$[X^N q_o^N]^T = [X^P q_o^P]^T \qquad (41)$$

An inertial matrix is represented by Equation (42).
[Math. 43]

[Math. 43]

$$M \equiv \begin{bmatrix} \begin{bmatrix} m_P \\ & L \end{bmatrix} & & & 0 \\ & \begin{bmatrix} m_C \\ & L \end{bmatrix} & & 0 \\ 0 & & \ddots & \\ & 0 & & \begin{bmatrix} m_C \\ & L \end{bmatrix} \end{bmatrix} \in R^{2N \times 2N} \qquad (42)$$

A damping matrix is represented by Equation (43).

[Math. 44]

$$C \in R^{2N \times 2N} \qquad (43)$$

A rigidity matrix (a portion related to intermediate displacement of the fluid machine element) is represented by Equation (44).

[Math. 45]

$$K \in R^{2N \times 2N} \qquad (44)$$

A rigidity matrix (a portion related to the basic forced displacement excitation) is represented by Equation (45).

[Math. 46]

$$K_B \in R^{2N \times 1} \qquad (45)$$

Particularly, elements of the rigidity matrix and the damping matrix can be formed with reference to Equation (9). From the equation of motion of the vibration isolation system 4, a transfer function T(s) from the forced displacement disturbance of the base surface 3 to the state quantity of each element can be derived as Equation (46).

[Math. 47]

[Math. 47]

$$\Xi = \underbrace{[(Ms^2 + Cs + K)^{-1} K_B]}_{T(s)} x_B \qquad (46)$$

The vibration transmission characteristics are obtained as Equation (47) in which jω is substituted for a Laplace operator s and an absolute value is taken.

[Math. 48]

$$|T(s \to j\omega)| \in R^{2N} \qquad (47)$$

Figure 5:
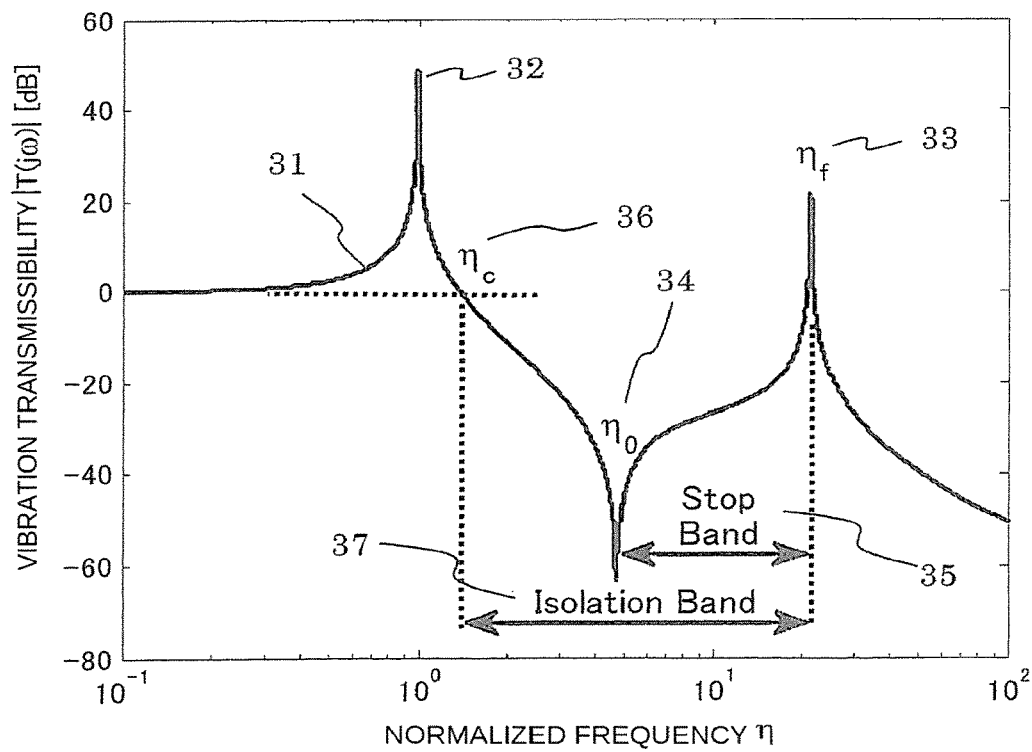
FIG. 5 is a graph for showing vibration propagation characteristics of the vibration propagation suppressing apparatus according to the first embodiment of this invention.

Vibration transmission characteristics 31 of the vibration isolation system 4 using the vibration propagation suppressing apparatus 1 are illustrated in FIG. 5. FIG. 5 is a graph for showing components related to the precision instrument 2 among the vibration transmission characteristics of the vibration propagation suppressing apparatus according to the first embodiment of this invention. Here in FIG. 5, a vertical axis represents a vibration transmissibility |T(jω)|, and a horizontal axis represents a normalized frequency η in which the logarithm is taken.

From the graph of FIG. 5, it is seen that, in the vibration isolation system 4, obtained is such a frequency response function that an antiresonance frequency ($\eta_o$) 34 appears in an intermediate frequency range between a primary resonance frequency 32 and a secondary resonance frequency ($\eta_f$) 33.

Here, a generation band of the band gap 30 illustrated in FIG. 4 corresponds to a band from the antiresonance frequency ($\eta_o$) 34 to the secondary resonance frequency ($\eta_f$) 33. That is, when the lowest-order natural frequency of the entire vibration isolation system 4 is represented as $\omega_1$, the antiresonance frequency ($\eta_o$) 34 and the secondary resonance frequency ($\eta_f$) 33, which are normalized with the lowest-order natural frequency $\omega_1$ as a reference, are represented by Equation (48) and Equation (49), respectively.

[Math. 49]

$$\eta_0 = \frac{\omega_{acs}(\mu = \pi)}{\omega_1} \qquad (48)$$

[Math. 50]

$$\eta_f = \frac{\omega_{opt}(\mu = 0)}{\omega_1} = \frac{\omega_f}{\omega_1} \qquad (49)$$

A band between the antiresonance frequency ($\eta_o$) 34 and the secondary resonance frequency ($\eta_f$) 33 matches with the band of the band gap 30 between the acoustic branch 28 and the optical branch 29. In this band, the elastic traveling wave exhibits an aspect of scattering and being spatially damped in the inside of the fluid machine element, and as a result, a band with a low response magnification factor appears on the frequency response function. Such a frequency band with a low response magnification factor, which is illustrated by a section from Equation (48) to Equation (49), is referred to as a stop band 35. The stop band 35 is determined by only design of a single piece of the fluid machine element 5 which form the vibration isolation system 4.

Meanwhile, a section with a lower response magnification factor, which ranges from a normalized cutoff frequency ($\eta_c$) 36 to the antiresonance frequency ($\eta_o$) 34, is brought by a usual vibration isolation effect. Here, such a low-response-magnification-factor section brought by the vibration isolation and the stop band 35 are collectively referred to as a vibration isolation band 37.

Figure 6:
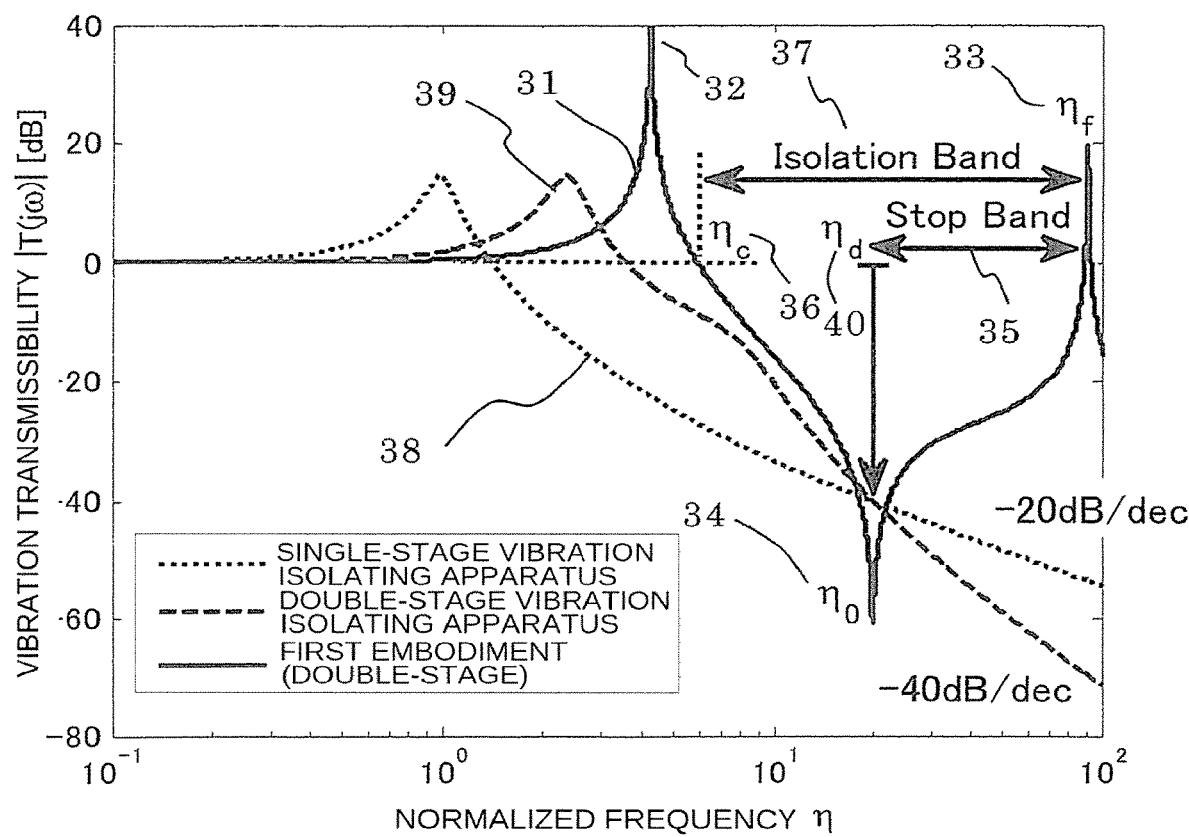
FIG. 6 is a graph for showing superiority of the vibration propagation suppressing apparatus according to the first embodiment of this invention.

Here, superiority of the vibration propagation suppressing apparatus 1 to the related-art vibration isolating apparatus is described with reference to FIG. 6. FIG. 6 is a graph for showing the superiority of the vibration propagation suppressing apparatus according to the first embodiment of this invention. In FIG. 6, a vertical axis represents a vibration transmissibility |T(jω)|, and a horizontal axis represents a normalized frequency η in which the logarithm is taken. In FIG. 6, the vibration transmission characteristics 31 are the vibration transmission characteristics of the vibration propagation suppressing apparatus 1 of the present invention, vibration transmission characteristics 38 are the vibration transmission characteristics of the related-art single-stage vibration isolating apparatus, and vibration transmission characteristics 39 are the vibration transmission characteristics of the related-art double-stage vibration isolating apparatus.

As seen from FIG. 6, the antiresonance frequency does not appear even when the number of stages is increased in the related-art double-stage vibration isolating apparatus. Accordingly, the apparatus is designed so that the excitation frequency of the forced displacement disturbance, that is, the disturbance frequency ($\eta_d$) 40 matches with a slope on a high frequency side after a resonance with the same number as the number of stages appears. However, in the present invention formed of the fluid machine elements 5 each having the band gap 30, the antiresonance frequency ($\eta_o$) 34 is present, thereby the slope from the primary resonance frequency 32 to the antiresonance frequency ($\eta_o$) 34 becomes steep, and in addition, the vibration isolation band 37 that falls below 1 appears in a band from the primary resonance frequency 32 to before the secondary resonance frequency ($\eta_f$) 33. Therefore, as illustrated in FIG. 6, the apparatus is designed so that the disturbance frequency ($\eta_d$) 40 matches with the vibration isolation band 37, thus making it possible to set the primary resonance frequency 32 of the apparatus on the high frequency side in comparison with the related-art apparatus.

This result indicates that, for example, in comparison with the related-art product, a vibration propagation suppressing apparatus loaded for preventing vibrations in an artificial satellite can increase rigidity thereof and reduce weight thereof when the vibration propagation suppressing apparatus 1 is applied to the apparatus. Thus, when the vibration propagation suppressing apparatus 1 is applied to the vibration propagation suppressing apparatus loaded for preventing vibrations in the artificial satellite, there are attained such unprecedented and significant effects as improvement in durability against a vibration/impact environment in launching, and further, saving of a propulsion material for a rocket used in launching.

Figure 7:
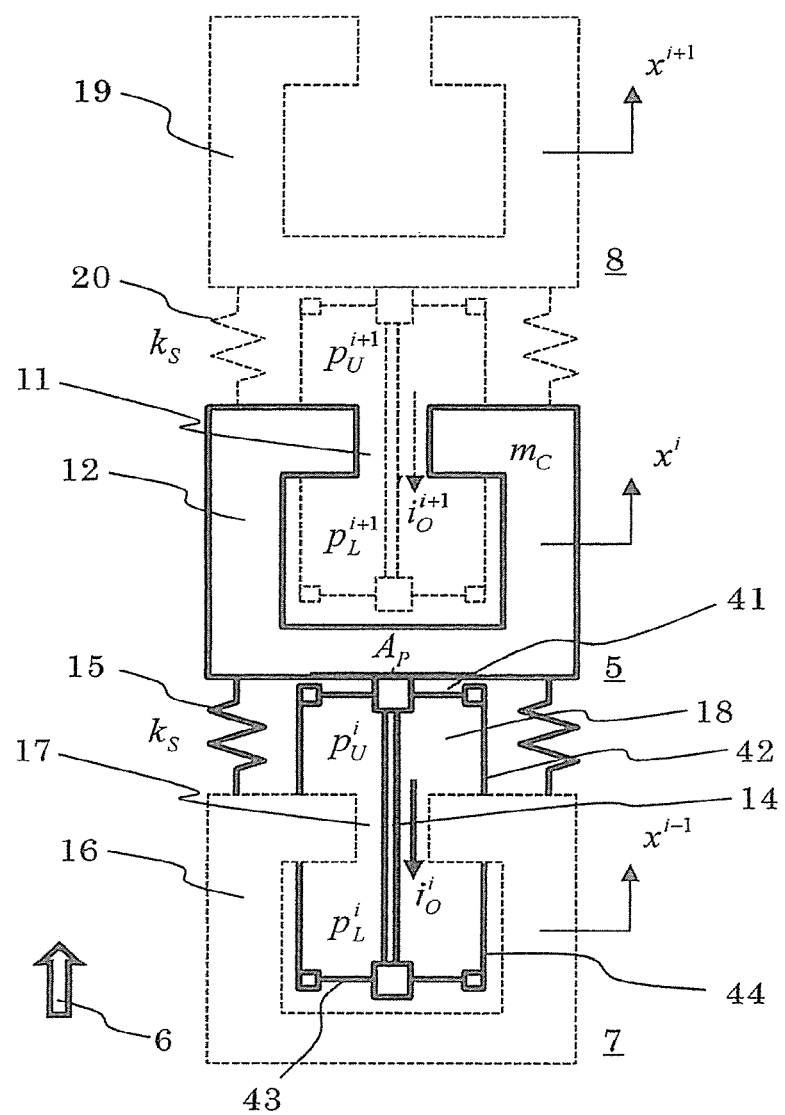
FIG. 7 is a view for illustrating an embodying mode of the mechanical model on the periphery of the fluid machine element in the vibration propagation suppressing apparatus according to the first embodiment of this invention.

In the first embodiment, the upper volume chamber 9 and the lower volume chamber 10 are formed of bellows. However, the upper volume chamber and the lower volume chamber may have another structure as long as the another structure is provided with similar flexibility and volume compliance in the vibration propagation direction 6. For example, as illustrated in FIG. 7, there may be adopted an upper volume chamber 42 formed of an upper diaphragm 41 and a sufficiently rigid wall surface, and a lower volume chamber 44 formed of a lower diaphragm 43 and a sufficiently rigid wall surface.

Figure 8:
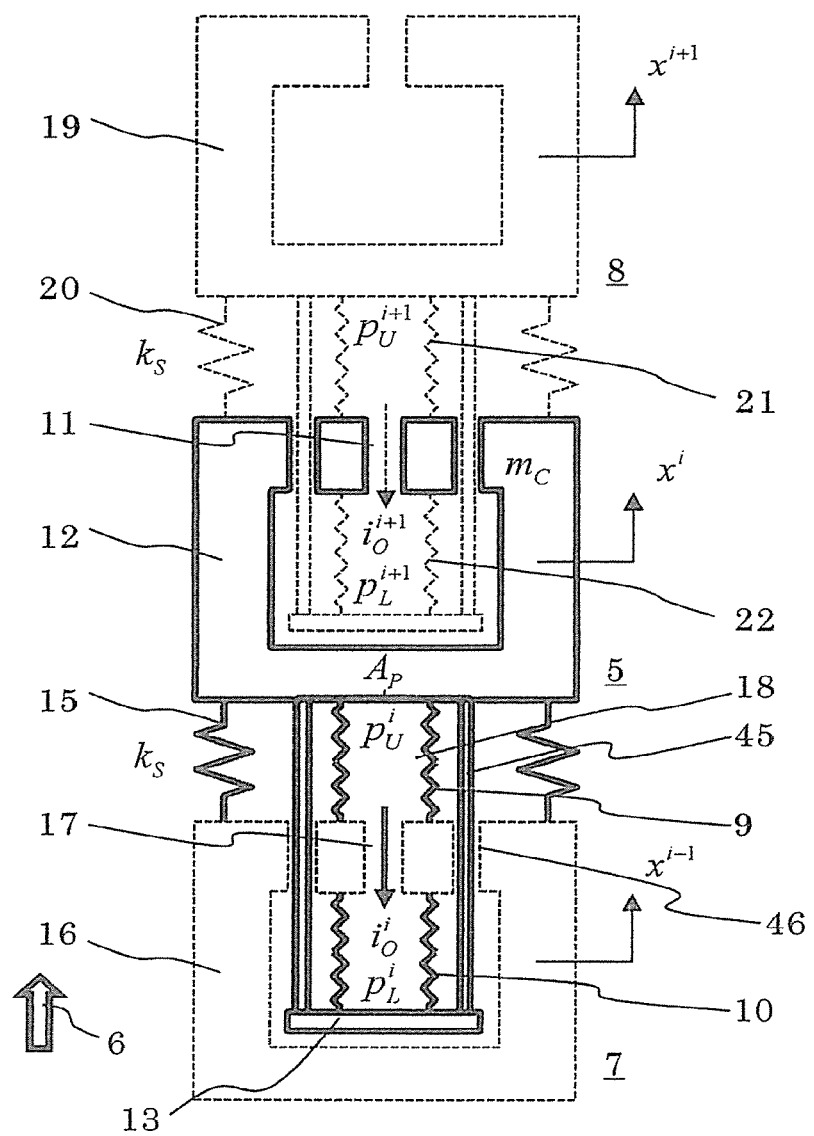
FIG. 8 is a view for illustrating another embodying mode of the mechanical model on the periphery of the fluid machine element in the vibration propagation suppressing apparatus according to the first embodiment of this invention.

Moreover, the coupling rod 14 is placed inside the closed space 18 so as to penetrate the orifice 17 in the above-described first embodiment. However, the coupling rod 14 may be placed on the outside of the closed space 18 so as to couple and integrate the intermediate 12 and the flange 13 with each other. For example, even when outer shaft-type coupling rods 45 are installed as illustrated in FIG. 8, the band gap and stop band effects appear. At this time, it is only required that spaces 46 be secured in the intermediate 16 so as to prevent the intermediate 16 from interfering with the coupling rods 45.

Second Embodiment

In the vibration propagation suppressing apparatus 1, as illustrated in FIG. 5, the vibration isolation band 37 appears in a section from cutoff frequency ($\eta_c$) 36 to the secondary resonance frequency ($\eta_f$) 33 due to the vibration isolation effect and the vibration propagation suppression effect. Particularly, at the antiresonance frequency ($\eta_o$) 34 that is a stop band starting frequency, the response magnification factor becomes ideally 0. Accordingly, when the disturbance frequency ($\eta_d$) 40 is allowed to match with the antiresonance frequency ($\eta_o$) 34, the most superior vibration propagation suppression effect is attained. However, in a case of attempting to ensure a deep antiresonance frequency ($\eta_o$) 34, the primary resonance frequency 32 exceeds others as illustrated in FIG. 5. Accordingly, when a steady disturbance is added to the primary resonance frequency 32, even when the steady disturbance is minute, there occurs a practical problem that an internal pressure and displacement of the vibration propagation suppressing apparatus 1 are increased. Moreover, when a transient disturbance is added, there occurs a problem that it takes a time to settle the entire vibration isolation system 4 including the apparatus. Hence, in actuality, it is desired that a damping effect be given in order to reduce the primary resonance frequency 32. For example, it is desired to take such measures as adopting, as a fluid, a viscous fluid having a certain dynamic viscosity.

However, such giving of the damping as mentioned above buries the antiresonance frequency ($\eta_o$) 34, and the steep vibration propagation suppression effect is damaged. Hence, in the second embodiment, a selection principle (range) of the fluid dynamic viscosity for preventing the antiresonance frequency ($\eta_o$) 34 from being buried is given.

The principle is theoretically derived below.

First, the antiresonance frequency ($\eta_o$) 34 corresponds to a zero point of an element, which indicates vibration transmission characteristics from a forced displacement of the base surface 3 to a response displacement of the precision instrument 2, in Equation (47) that is a group of the vibration transmission characteristics of the vibration propagation suppressing apparatus 1. Accordingly, when attention is paid to a numerator polynomial of the vibration transmission characteristics in the corresponding term, this can be analytically represented by Equation (50).

[Math. 51]

$$num = \{L(C_v k_s + 2A_P^2)s^2 + R(C_v k_s + 2A_P^2)s + 2k_s\}^n \quad (50)$$

polynomial in which a power of braces is only increased in response to the number of stages "n" of the fluid machine elements 5. This is organized to become Equation (51).

[Math. 52]

$$num = (C_V k_S + 2A_P^2)^n \left( Ls^2 + Rs + \frac{2k_S}{C_V k_S + 2A_P^2} \right)^n \quad (51)$$

In Equation (51), a first-half parenthesis portion of the numerator polynomial is a constant. Meanwhile, when attention is paid to the polynomial in the inside of a second-half parenthesis, this is similar to a characteristic equation of a spring mass damper system in which a spring and a damper are incorporated in parallel to each other. That is, a characteristic equation of such a general spring mass damper system as illustrated in FIG. 2 is represented by Equation (52).

[Math. 53]

$$m_p s^2 + cs + k_s \quad (52)$$

where
$m_p$: mass [kg]
$k_s$: rigidity of spring [N/m]
c: viscous damping coefficient of damper [Ns/m]

In the field of the vibration engineering, it is known that, in the spring mass damper system, a resonance magnification factor at the time of steady vibration or a transient response such as a step or impulse response is characterized by a damping ratio represented by Equation (53), and for the steady vibration, the resonance disappears by Equation (54).

[Math. 54]

$$\zeta \equiv \frac{c}{2\sqrt{m_P k_S}} \quad (53)$$

[Math. 55]

$$\zeta > \frac{1}{\sqrt{2}} \quad (54)$$

When the fact is applied to Equation (51) of the present invention, it is seen that Equation (55) is an occurrence requirement of an antiresonance.

[Math. 56]

$$\zeta \equiv \frac{R}{2\sqrt{\frac{2Lk_S}{C_V k_S + 2A_P^2}}} < \frac{1}{\sqrt{2}} \quad (55)$$

That is, when this is represented by the pipe flow resistance R of the orifice 17, Equation (56) is established.

[Math. 57]

$$R < \sqrt{\frac{4Lk_S}{C_V k_S + 2A_P^2}} \equiv R_C \quad (56)$$

Here, when Rc is referred to as a critical pipe flow resistance, the antiresonance frequency ($\eta_o$) 34 appears when the pipe flow resistance R is set smaller than the critical pipe flow resistance Rc, and the expected vibration propagation suppression effect is attained.

Figure 9:
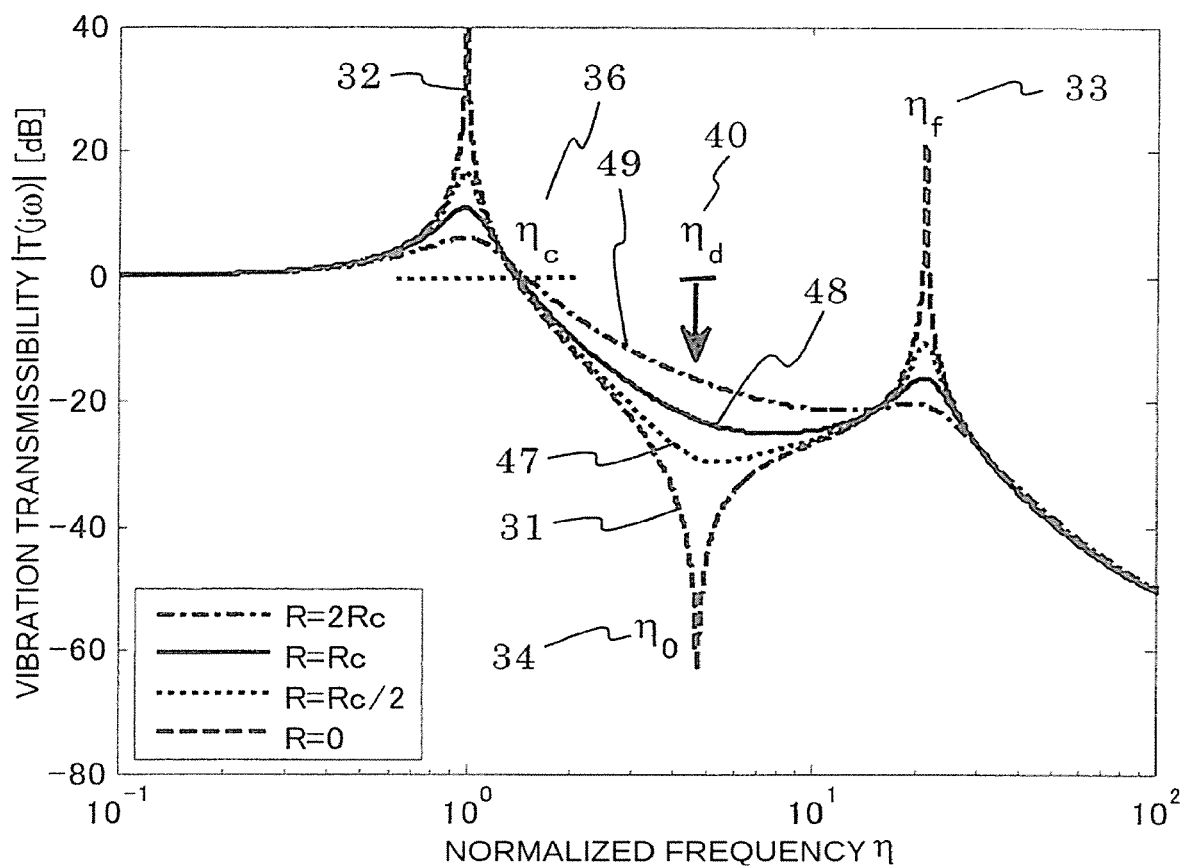
FIG. 9 is a graph for showing vibration propagation characteristics using, as a parameter, an orifice pipe flow resistance in the vibration propagation suppressing apparatus according to a second embodiment of this invention.

A result of measuring the vibration transmission characteristics by using the pipe flow resistance R as a parameter in the vibration propagation suppressing apparatus 1 in order to confirm this feature is illustrated in FIG. 9. FIG. 9 is a graph for showing the vibration propagation characteristics using, as a parameter, the orifice pipe flow resistance in the vibration propagation suppressing apparatus according to the second embodiment of this invention. In FIG. 9, a vertical axis represents a vibration transmissibility |T(jω)|, and a horizontal axis represents a normalized frequency η in which the logarithm is taken. In FIG. 9, curves 31, 47, 48, and 49 are vibration transmission characteristics when R is set as: R=0 (no damping); R=Rc/2; R=Rc; and R=2Rc, respectively.

From FIG. 9, it is seen that the antiresonance frequency ($\eta_o$) 34 disappears in the curve 48. That is, it is confirmed that, when the orifice pipe flow resistance becomes a certain level or more, that is, when the damping becomes as high as a fixed value or more, the antiresonance frequency ($\eta_o$) 34 is buried, and the vibration propagation suppression effect of the vibration propagation suppressing apparatus 1 is damaged.

From these facts, the pipe flow resistance R of the orifice is set within the range given by Equation (56), thereby the vibration propagation suppressing apparatus with high damping/high cutoff characteristics can be achieved, which can attain the vibration propagation suppression effect while suppressing the primary resonance frequency 32.

Equations (2) and (3) are assigned to the effective fluid mass L and the pipe flow resistance R in Equation (56), thereby the range of the fluid dynamic viscosity for attaining the above-described effect is obtained more in detail.

An occurrence condition of the antiresonance frequency ($\eta_o$) 34 is represented by Equation (57).

[Math. 58]

$$v < \frac{A_O^2}{4\pi\rho l}\sqrt{\frac{\rho l k_S}{A_o(C_V k_S + 2A_P^2)}} \quad (57)$$

As seen from Equation (57), it can be confirmed that the occurrence condition of the antiresonance frequency ($\eta_o$) 34 is characterized in being determined by only the design of the single fluid machine element and not depending on the precision instrument 2 that is a support target.

Third Embodiment

In the above-described second embodiment, the dynamic viscosity of the fluid is increased, thereby the response magnification factor of the primary resonance frequency 32 is reduced, and the strength of the apparatus is increased, and the settling characteristics of the transient response are improved. However, as a side effect of this, there remains a problem that the response magnification factor at the disturbance frequency ($\eta_d$) 40 is increased to degrade the vibration propagation suppression effect.

In a third embodiment, a vibration propagation suppressing apparatus 53 is obtained, which can reduce the response magnification factor of the primary resonance frequency 32 while maintaining the response magnification factor at the disturbance frequency ($\eta_d$) 40 to be approximately equal to that at the time of no damping.

Figure 10:
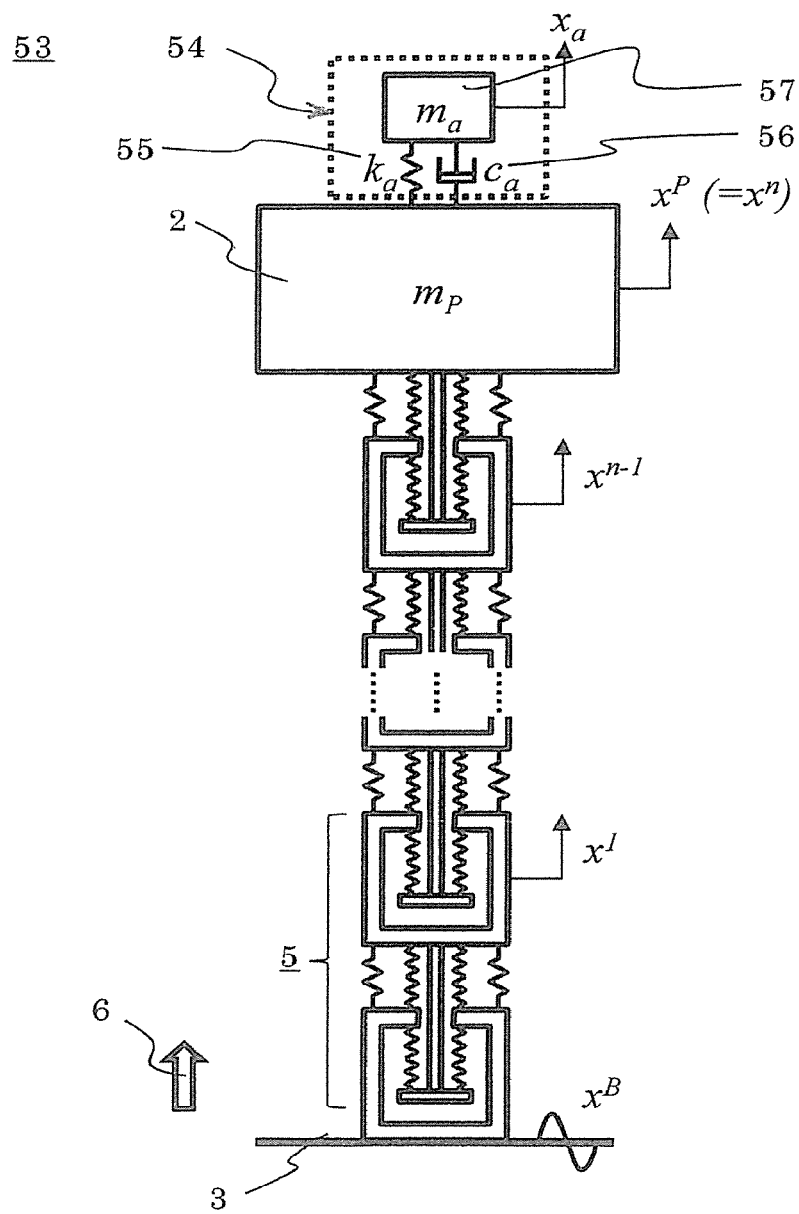
FIG. 10 is a view for illustrating a mechanical model of a vibration propagation suppressing apparatus according to a third embodiment of this invention.

FIG. 10 is a view for illustrating a mechanical model of the vibration propagation suppressing apparatus according to the third embodiment of this invention.

In FIG. 10, the vibration propagation suppressing apparatus 53 is an apparatus in which a dynamic vibration absorber 54 is added to the vibration propagation suppressing apparatus 1. The dynamic vibration absorber 54 includes an additional elastic element 55 that has elasticity in the vibration propagation direction 6, an additional damping element 56 that has damping characteristics in the vibration propagation direction 6, and an additional mass body 57. The additional elastic element 55 is a rubber member, a spring, or the like, which has elasticity in the vibration propagation direction 6. Moreover, the additional damper 56 is an oil damper, an air damper, or the like. Furthermore, functions of the additional elastic element 55 and the additional damping element 56 are achieved and formed of only a viscous elastic body or a vibration damping alloy. The additional elastic element 55 and the additional damping element 56 are placed between the precision instrument 2 and the additional mass body 57, and support the additional mass body 57 in a state of being connected in parallel to each other. A natural frequency determined by the elasticity of the additional elastic element 55 and the mass of the additional mass body 57 is adjusted so as to match with the primary resonance frequency 32 of the vibration propagation suppressing apparatus 1 that does not include the dynamic vibration absorber 54.

Figure 11:
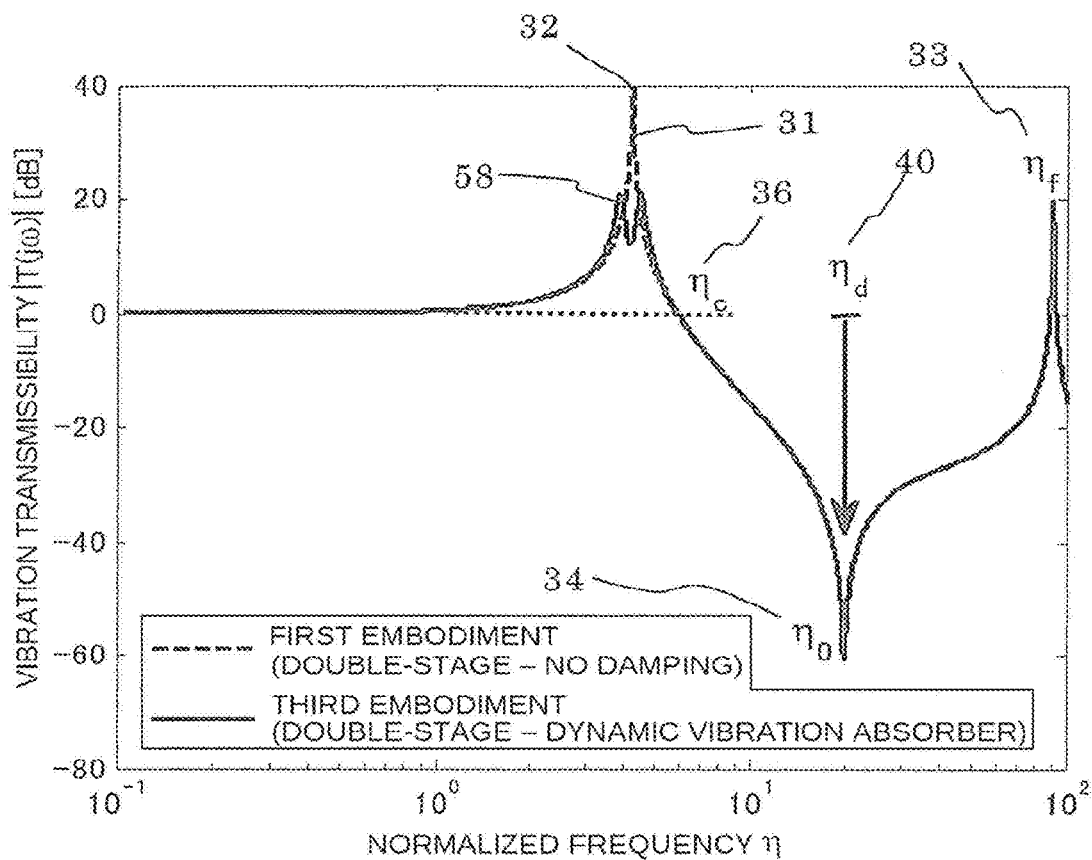
FIG. 11 is a graph for showing vibration propagation characteristics of the vibration propagation suppressing apparatus according to the third embodiment of this invention.
Figure 12:
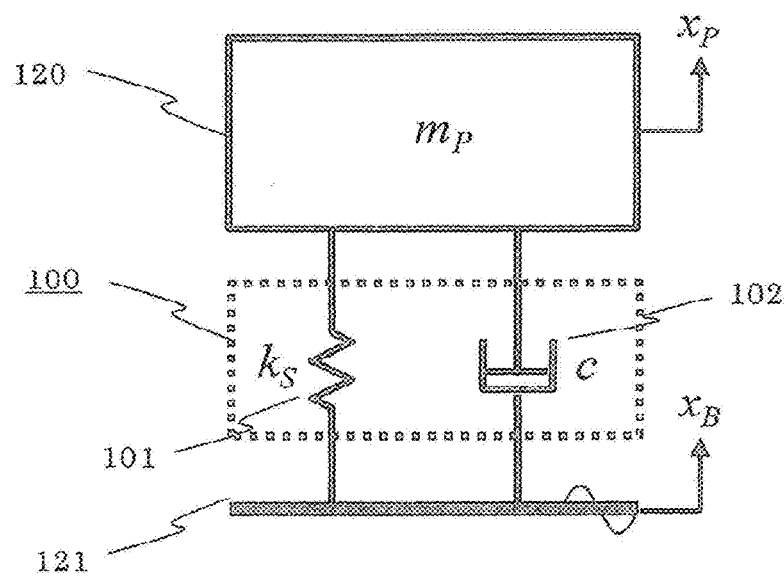
FIG. 12 is a view for illustrating a mechanical model of a related-art single-stage vibration isolating apparatus.
Figure 13:
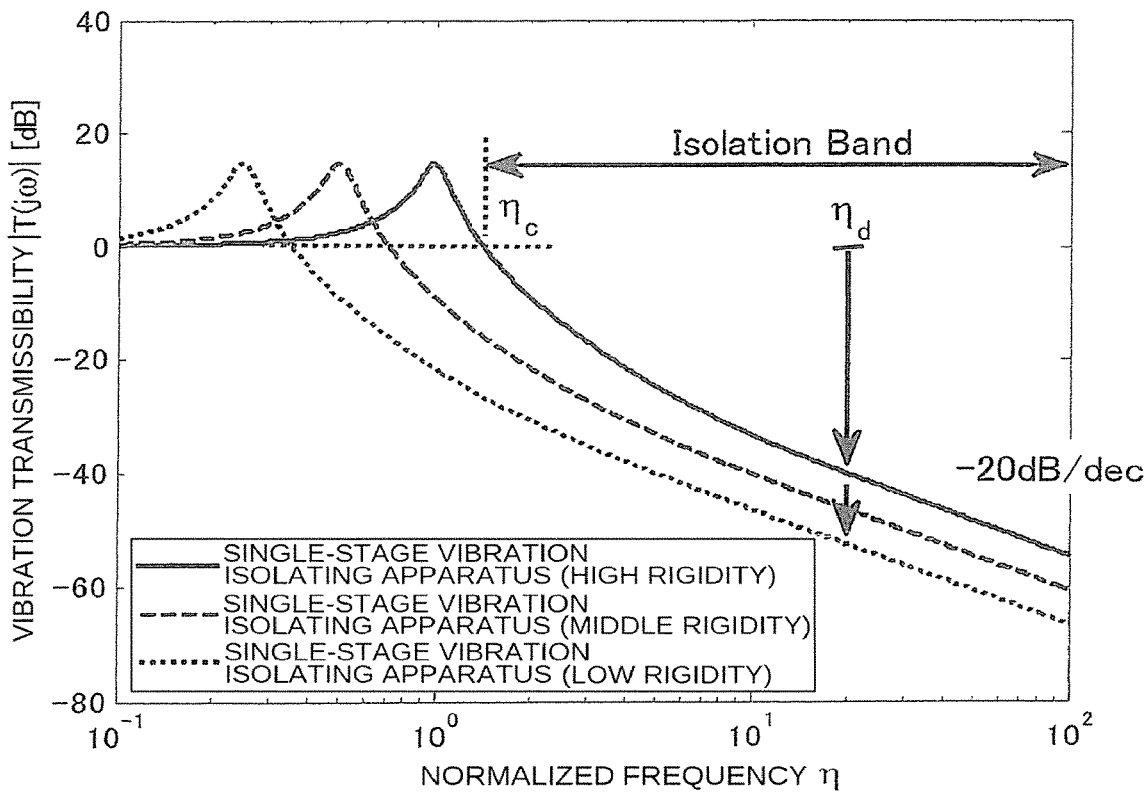
FIG. 13 is an explanatory graph for showing a method for improving vibration transmission characteristics in the related-art single-stage vibration isolating apparatus.
Figure 14:
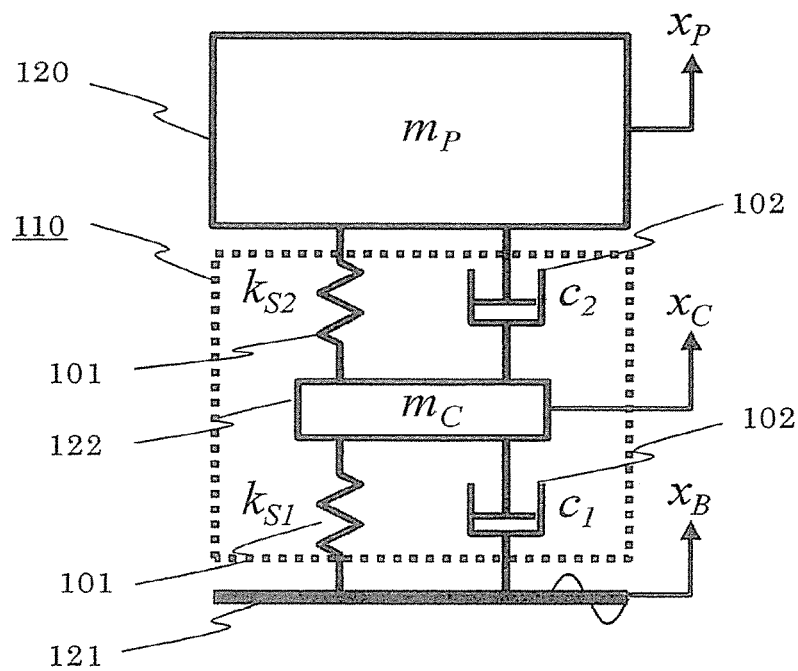
FIG. 14 is a view for illustrating a mechanical model of a related-art double-stage vibration isolating apparatus.
Figure 15:
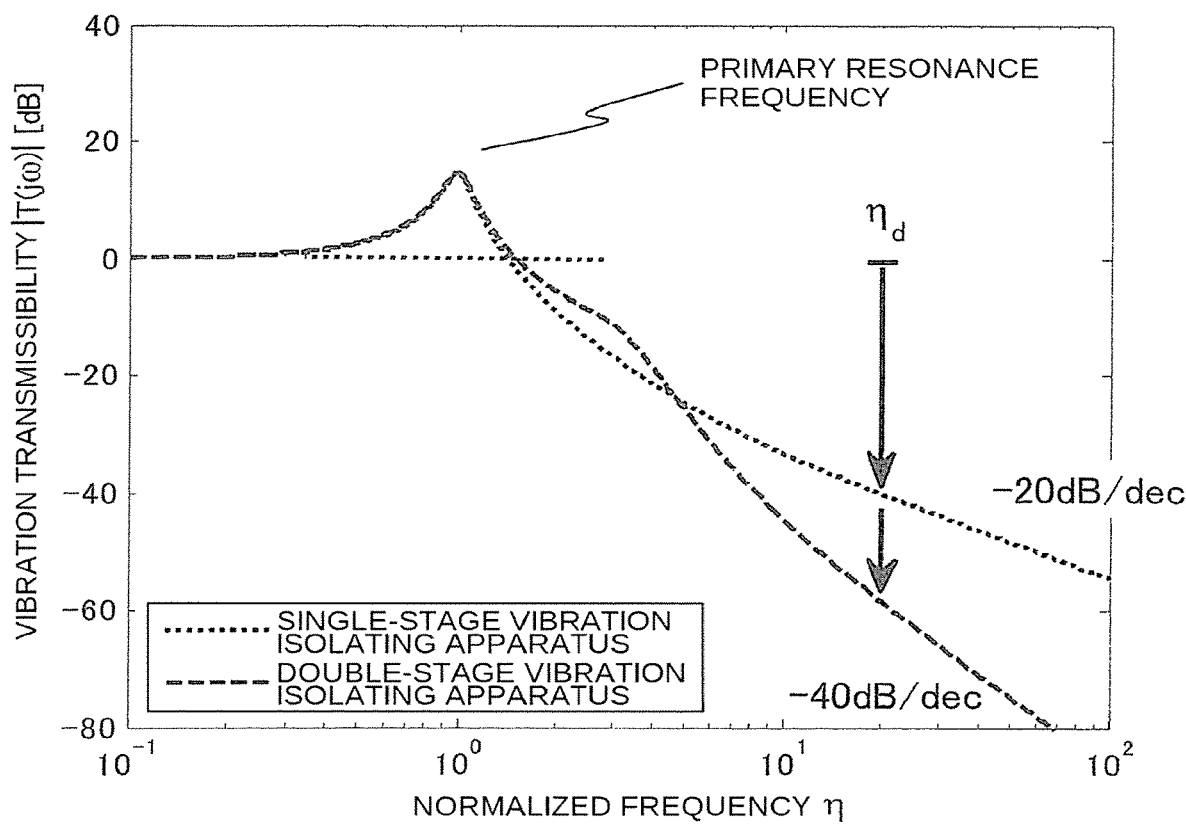
FIG. 15 is a comparison graph for showing vibration transmission characteristics in the related-art single-stage vibration isolating apparatus and the related-art double-stage vibration isolating apparatus.
Figure 16:
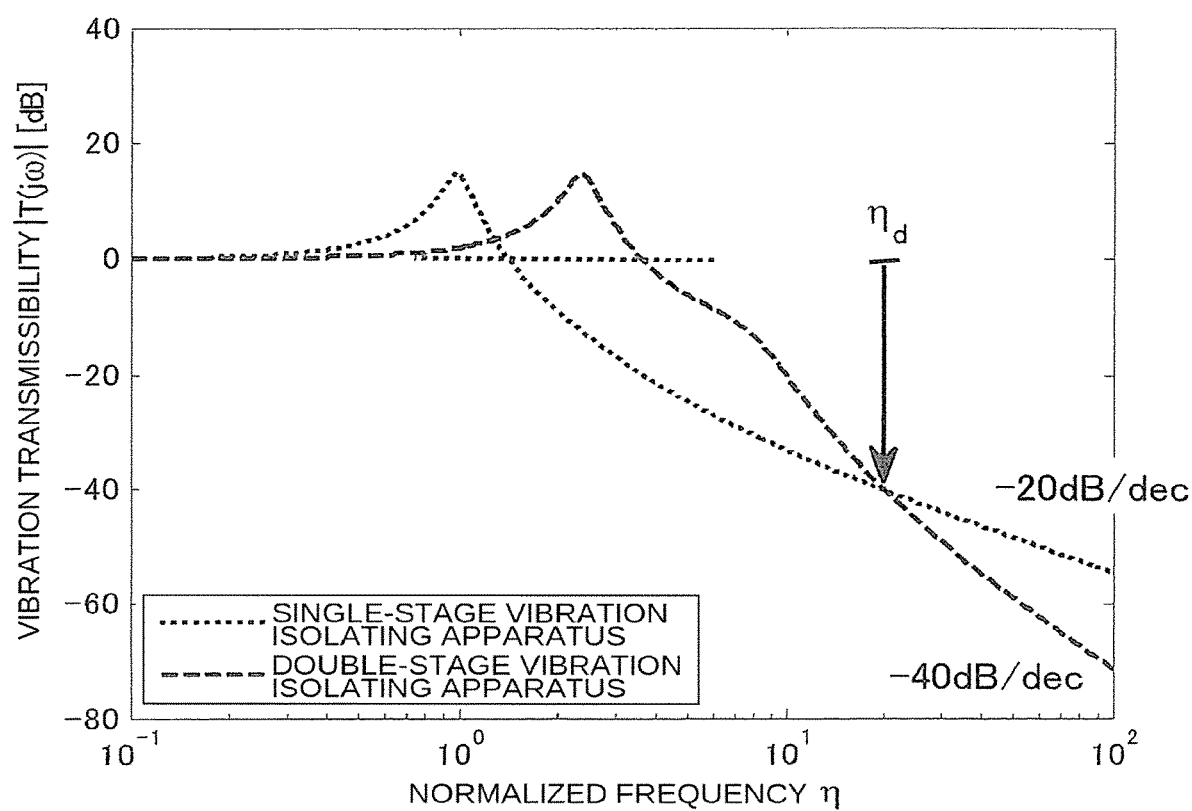
FIG. 16 is a comparison graph for showing vibration transmission characteristics in the related-art single-stage vibration isolating apparatus and the related-art double-stage vibration isolating apparatus.

Next, vibration transmission characteristics of the vibration propagation suppressing apparatus 53 is illustrated in FIG. 11. FIG. 11 is a graph for showing the vibration propagation characteristics of the vibration propagation suppressing apparatus according to the third embodiment of this invention. In FIG. 11, a vertical axis represents a vibration transmissibility |T(jω)|, and a horizontal axis represents a normalized frequency η in which the logarithm is taken. In FIG. 11, vibration transmission characteristics 58 is the vibration propagation characteristics of the vibration propagation suppressing apparatus 53, and the vibration transmission characteristics 31 is the vibration propagation characteristics of the vibration propagation suppressing apparatus 1.

From FIG. 11, it is seen that, in the vibration propagation suppressing apparatus 53, the magnification factor of the primary resonance frequency 32 is reduced owing to an effect of the dynamic vibration absorber 54. Moreover, it is seen that, in the vibration propagation suppressing apparatus 53, the response magnification factor is maintained at the same level as that of the non-damping vibration propagation suppressing apparatus 1 in the first embodiment at the disturbance frequency ($\eta_d$) 40. Thus, the vibration propagation suppressing apparatus 53 including the dynamic vibration absorber 54 of the third embodiment can simultaneously achieve both of a higher damping effect and a higher vibration propagation suppression effect than those of the first and second embodiments.

REFERENCE SIGNS LIST 5 fluid machine element, 6 vibration propagation direction, 7, 8 fluid machine element, 9, 21 upper volume chamber (first volume chamber), 10, 22 lower volume chamber (second volume chamber), 11, 17 orifice, 12, 16, 19 intermediate, 14 coupling rod, 15, 20 elastic body, 32 primary resonance frequency 32, 33 secondary resonance frequency, 37 vibration isolation band, 55 additional elastic element, 56 additional damping element, 57 additional mass body

The invention claimed is:

1. A vibration propagation suppressing apparatus for supporting a support target with respect to a base surface, the vibration propagation suppressing apparatus comprising:
a plurality of fluid machine elements placed between the base surface that receives a forced displacement disturbance and the support target by being coupled in series to one another in a vibration propagation direction from the base surface to the support target,
wherein each of the plurality of fluid machine elements includes:
a first volume chamber filled with a fluid and having a first volume that chances with respect to a first internal pressure variation;
a second volume chamber coupled to the first volume chamber through an orifice, filled with the fluid and having a second volume that changes with respect to a second internal pressure variation;
an intermediate section forming the orifice and having an intermediate mass; and
a coupling rod configured to couple a first end portion of the first volume chamber, the first end portion being opposite with the orifice, and a second end portion of the second volume chamber, the second end portion being opposite with the orifice, to each other,
wherein, in the plurality of fluid machine elements,
a first end portion of a first volume chamber of one fluid machine element in the plurality of fluid machine elements is connected to an intermediate section of an adjacent fluid machine element in the plurality of fluid machine elements that is adjacent to the first end portion side of the first volume chamber of the one fluid machine element, an intermediate section of the one fluid machine element is connected to the intermediate section of the adjacent fluid machine element through intermediation of an elastic body, and the first volume chamber and the second volume chamber are connected to each other so as to be alternately arranged in the vibration propagation direction,
wherein a first fluid machine element in the plurality of fluid machine elements and arranged has an intermediate section connected to the base surface,
wherein a final fluid machine element in the plurality of fluid machine elements and arranged has a first end portion of a first volume chamber connected to the support target, and has an intermediate section connected to the support target through intermediation of an elastic body, and
wherein each of the plurality of fluid machine elements has dispersion relationships matching with each other, and has a band gap on the dispersion relationships.

2. The vibration propagation suppressing apparatus according to claim 1,
wherein, in each of the plurality of fluid machine elements, a pipe flow resistance value of the orifice is selected in accordance with Equation (1)
[Math. 1]

$$R < \sqrt{\frac{4Lk_s}{C_V k_3 + 2A_P^2}} \quad (1)$$

where $R = \dfrac{8\pi \rho \upsilon l}{4}$ : pipe flow resistance of orifice $[Pa-s/m^3]$ $L = \dfrac{\rho l}{A_o}$ : equivalent inertia of fluid flowing through orifice $[Pa-s/m^3]$ $\rho$ : density of fluid $[kg/m^3]$ $\upsilon$ : dynamic viscosity of fluid $[m^2/s]$ $l$ : length of orifice $[m]$ $A_o$ : cross − sectional area of orifice $[m^2]$ $A_p$ : fluid pressure receiving area $[m^2]$ $C_v$ : volume compliance of volume chamber $[m^3/Pa]$.

: equivalent inertia of fluid flowing through orifice [Pa-s/m³]
ρ: density of fluid [kg/m³]
υ: dynamic viscosity of fluid [m²/s]

l: length of orifice [m]
$A_D$: cross-sectional area of orifice [m²]
$A_P$: fluid pressure receiving area [m²]
$C_v$: volume compliance of volume chamber [m⁸/Pa].

3. The vibration propagation suppressing apparatus according to claim 1, further comprising:
- an additional elastic element having elasticity in the vibration propagation direction;
- an additional damping element having damping characteristics in the vibration propagation direction; and
- an additional mass body,
- wherein the additional elastic element and the additional damping element are placed between the support target and the additional mass body in a state of being connected in parallel to each other, and
- wherein a natural frequency determined by a mass of the additional mass body and elasticity of the additional elastic element matches with a primary resonance frequency of the plurality of fluid machine elements coupled in series to one another.

4. The vibration propagation suppressing apparatus according to claim 1, wherein, on vibration transmission characteristics between the base surface and the support target, the vibration propagation suppressing apparatus has a vibration isolation band between a primary resonance frequency and a secondary resonance frequency, the vibration isolation band having a response magnification factor falling below 1.

* * * * *